(12) United States Patent
Hayakawa et al.

(10) Patent No.: US 8,250,939 B2
(45) Date of Patent: Aug. 28, 2012

(54) TRANSMISSION OF VEHICLE

(75) Inventors: Koshi Hayakawa, Saitama (JP); Mikio Kashiwai, Saitama (JP); Akihiko Tomoda, Saitama (JP); Yoshihisa Ieda, Saitama (JP); Kanau Iwashita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 434 days.

(21) Appl. No.: 12/544,322

(22) Filed: Aug. 20, 2009

(65) Prior Publication Data
US 2010/0050805 A1 Mar. 4, 2010

(30) Foreign Application Priority Data
Aug. 29, 2008 (JP) .................................. 2008-221410

(51) Int. Cl.
*B60K 20/00* (2006.01)

(52) U.S. Cl. ..................... 74/335; 74/473.25; 74/473.26
(58) Field of Classification Search ................... 74/335, 74/473.1, 473.24, 473.25, 473.26
See application file for complete search history.

(56) References Cited

U.S. PATENT DOCUMENTS

| 2,748,643 A * | 6/1956 | Irtenkauf ........................ 82/132 |
| 3,774,475 A * | 11/1973 | Meysenburg et al. ........ 475/158 |
| 4,754,662 A * | 7/1988 | Misawa ..................... 74/473.22 |
| 4,967,616 A * | 11/1990 | Minami et al. ................. 74/335 |
| 7,600,446 B2 * | 10/2009 | Mizuno et al. ............... 74/473.1 |

FOREIGN PATENT DOCUMENTS
JP 1-116240 U 8/1989
* cited by examiner

*Primary Examiner* — Ha D. Ho
(74) *Attorney, Agent, or Firm* — Birch, Stewart, Kolasch & Birch, LLP

(57) ABSTRACT

A transmission for a vehicle for performing a shift manipulation at a desired time while ensuring a favorable operation feeling. A lost motion member is arranged in a shift drive force transmitting mechanism arranged between a shift spindle and a shift drum, and a rotary position of the shift drum is resiliently held by a shift stopper mechanism in a state where one of a plurality of gear trains is established or in a neutral state. A state which allows a changeover operation of an established state of a plurality of gear trains due to an action of a shift drive force which is temporarily accumulated by a lost motion means and a state which interrupts the changeover operation can be changed over by a shift restricting mechanism which is provided as a part separate from a shift stopper mechanism.

18 Claims, 15 Drawing Sheets

100: shift position sensor
107: spindle angle sensor
126: rotation restricting actuator
131: accumulated force quantity detection means
132: determination means
133: actuator control means

TRANSMISSION OF VEHICLE

CROSS-REFERENCE TO RELATED APPLICATIONS

The present application claims priority under 35 USC 119 to Japanese Patent Application No. 2008-221410 filed on Aug. 29, 2008 the entire contents of which are hereby incorporated by reference.

BACKGROUND OF THE INVENTION

1. Field of the Invention

The present invention relates to a transmission of a vehicle which includes a gear shift mechanism formed by arranging gear trains of a plurality of selectively establishable shift positions between a shift input shaft and a shift output shaft, a shift drum rotatably supported on an engine case for selectively establishing one of the plurality of gear trains in response to a rotational position, a shift spindle rotatably mounted on the engine case so as to be rotatable in response to a shift manipulation, a shift drive force transmitting mechanism arranged between the shift spindle and the shift drum so as to rotatably drive the shift drum in response to the rotation of the shift spindle, a lost motion means arranged in the shift drive force transmitting mechanism so as to temporarily accumulating a shift drive force transmitted from the shift spindle and a shift stopper mechanism resiliently holding a rotary position of the shift drum in a state where one of the plurality of gear trains is established or in a neutral state.

2. Description of Background Art

Japanese Patent No. JP-UM-A-01-116240 discloses a transmission for a vehicle wherein a lost motion means in a shift drive force transmitting mechanism is arranged between a shift spindle and a shift drum. Such a transmission can acquire a favorable operation feeling due to a lost motion action generated by a lost motion means when a dog contact arises at the time of changing over the establishment of a gear train in a gear shift mechanism.

In adopting the structure as disclosed in JP-UM-A-01-116240 which arranges the lost motion means in the shift drive force transmitting mechanism in a transmission which automatically changes over the engagement/disengagement of a clutch interposed between a power source output shaft and a shift input shaft using an actuator such as a power-operated motor, it is necessary to start a power transmission interrupting operation of the clutch at proper timing. More specifically, the lost motion means are not uniform in property. Thus, in performing a power transmission interrupting operation of the clutch in conformity with a shift manipulation, for example, when sufficient power is not accumulated in the lost motion means, a shift drum is not rotated until power for rotating the shift drum is accumulated in the lost motion means even when the clutch starts a power transmission interrupting operation, there exists a possibility that a shift manipulation which conforms to the shift operation is not performed. Further, when sufficient power is accumulated in the lost motion means, the shift drum is rotated before the power transmission interrupting operation of the clutch starts thus giving rise to a possibility that a shift operation which conforms to the shift manipulation is not performed.

SUMMARY AND OBJECTS OF THE INVENTION

It is an object of an embodiment of the present invention to provide a transmission for a vehicle for performing a shift manipulation at predetermined timing while ensuring a favorable shift manipulation feeling.

It is an object of an embodiment of the present invention to provide a transmission for a vehicle which includes a gear shift mechanism formed by arranging gear trains of a plurality of selectively establishable shift positions between a shift input shaft and a shift output shaft, a shift drum rotatably supported on an engine case for selectively establishing one of the plurality of gear trains in response to a rotational position, a shift spindle rotatably mounted on the engine case so as to be rotatable in response to a shift manipulation, a shift drive force transmitting mechanism arranged between the shift spindle and the shift drum so as to rotatably drive the shift drum in response to the rotation of the shift spindle, a lost motion means disposed in the shift drive force transmitting mechanism so as to temporarily accumulating a shift drive force transmitted from the shift spindle, and a shift stopper mechanism for resiliently holding a rotary position of the shift drum in a state wherein one of the plurality of gear trains is established or in a neutral state. The transmission further includes, separately from the shift stopper mechanism, a shift restricting mechanism for performing a changeover between a state which allows a changeover operation of an established state of the plurality of gear trains due to an action of the shift drive force which is temporarily accumulated by the lost motion means and a state which interrupts the changeover operation.

It is an object of an embodiment of the present invention to provide a shift restricting mechanism that is arranged closer to a shift drum side than the lost motion means on a shift drive force transmitting path formed by the shift drive force transmitting mechanism and is configured to change over an engagement thereof with a rotary member which constitutes a portion of the shift drive force transmitting mechanism and a disengagement thereof from the rotary member.

It is an object of an embodiment of the present invention to provide a shift drum center which constitutes the rotary member that is coaxially fixed to the shift drum outside the engine case which houses the shift drum. The shift restricting mechanism which changes over the engagement thereof with the shift drum center and the disengagement thereof from the shift drum center is arranged outside the engine case.

It is an object of an embodiment of the present invention to provide a shift restricting mechanism that includes a rotation restricting actuator for generating power for performing the changeover between the engagement of the shift restricting mechanism with the rotary member and the disengagement of the shift restricting mechanism from the rotary member and whose operation is controlled by an actuator control means.

It is an object of an embodiment of the present invention to provide a transmission that includes a clutch which changes over a connection/disconnection of transmission of power between a power source output shaft and the shift input shaft, a clutch actuator for performing an engagement/disengagement of the clutch, an accumulated force quantity detection means for detecting a temporarily accumulated quantity of shift drive force accumulated by the lost motion means and a determination means for determining whether or not a detected value of the accumulated force quantity detection means exceeds a predetermined value and outputs a determination result to the actuator control means. The actuator control means controls the rotation restricting actuator so as to operate the shift restricting mechanism to a side which allows the rotation of the shift drum in response to the determination of the determination means that the detected value of the accumulated force quantity detection means exceeds the predetermined value.

It is an object of an embodiment of the present invention to provide engaging recessed portions formed on an outer periphery of the shift drum center with the shift restricting mechanism including engaging members which are engageable with the engaging recessed portions and resilient members which resiliently bias the engaging members toward a side where engaging members (122, 116) that are engaged with the engaging recessed portions.

A main shaft 12 in the first embodiment corresponds to a shift input shaft of an embodiment of the present invention with a counter shaft 13 that corresponds to the shift output shaft of the present invention. A lost motion spring 62 corresponds to the lost motion means of an embodiment of the present invention. A shift drum center 72 corresponds to the rotary member of an embodiment of the present invention. A torsional spring 123 corresponds to the resilient member of an embodiment of the present invention. A positioning notch 115 corresponds to the engaging recessed portion of an embodiment of the present invention. A stopper arm 116 corresponds to an engaging member of an embodiment of the present invention. A coil spring 142 corresponds to a resilient member of an embodiment of the present invention.

With the use of the shift restricting mechanism which is provided as a part separate from the shift stopper mechanism, it is possible to change over the state which allows the changeover operation of the established state of the plurality of gear trains due to the action of the shift drive force which is temporarily accumulated by the lost motion means and the state which interrupts the changeover operation. Accordingly, the shift operation can be interrupted by the shift restricting mechanism until the lost motion means accumulates a sufficient power therein and allows the shift operation when necessary. Thus, the shift manipulation can be surely performed at predetermined timing irrespective of irregularities of a lost quantity by a lost motion means while acquiring favorable shift manipulation feeling due to a function of the lost motion means.

Further, the shift restricting mechanism is arranged closer to the shift drum side than the lost motion means on the shift drive force transmitting path formed by the shift drive force transmitting mechanism and is configured to change over a state in which the rotation of the shift drum is interrupted and a state in which the rotation of the shift drum is allowed by changing over the engagement thereof with the rotary member which constitutes a portion of the shift drive force transmitting mechanism and a disengagement thereof from the rotary member separately from the shift stopper mechanism. Accordingly, the rotation of the shift drum can be interrupted by the shift restricting mechanism until the lost motion means accumulates power sufficient for rotating the shift drum and can release a rotation interrupting state of the shift drum by the shift restricting mechanism when necessary. Thus, the shift manipulation can be surely performed at predetermined timing irrespective of irregularities of a lost quantity by a lost motion means while acquiring favorable shift manipulation feeling due to a function of the lost motion means.

Further, the shift drum center which constitutes the rotary member is coaxially fixed to the shift drum, and the shift restricting mechanism which changes over the engagement thereof with the shift drum center and the disengagement thereof from the shift drum center is arranged outside the engine case. Thus, the maintenance of the shift restricting mechanism can be easily performed.

Further, the operation of the rotation restricting actuator which the shift restricting mechanism includes is controlled by the control unit. Thus, the interruption of the rotation of the shift drum and the release of such interruption of rotation by the shift restricting mechanism can be changed over at proper timing.

Further, in performing the engagement/disengagement operation of the clutch which changes over the connection/disconnection of the transmission of power between the power source output shaft and the shift input shaft by the clutch actuator, when the detected value of the accumulated force quantity detection means exceeds the predetermined value, the control unit controls the rotation restricting actuator so as to operate the shift restricting mechanism toward a side which allows the rotation of the shift drum. Accordingly, the interruption of rotation of the shift drum and the release of such interruption of rotation by the shift restricting mechanism can be changed over at proper timing. Thus, the shift manipulation can be surely performed at a predetermined timing which conforms to the starting of the power transmission interrupting operation of the clutch.

Further, the shift restricting mechanism includes the engaging members which are engageable with the engaging recessed portions formed on the outer periphery of the shift drum center and the resilient members which resiliently bias the engaging members to a side where the engaging member is engaged with the engaging recessed portion. Accordingly, the rotation of the shift drum can be mechanically interrupted without using an actuator such as an electrically-operated motor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a mode for carrying out the present invention is explained based on embodiments of the present invention in conjunction with attached drawings.

Figure 1:
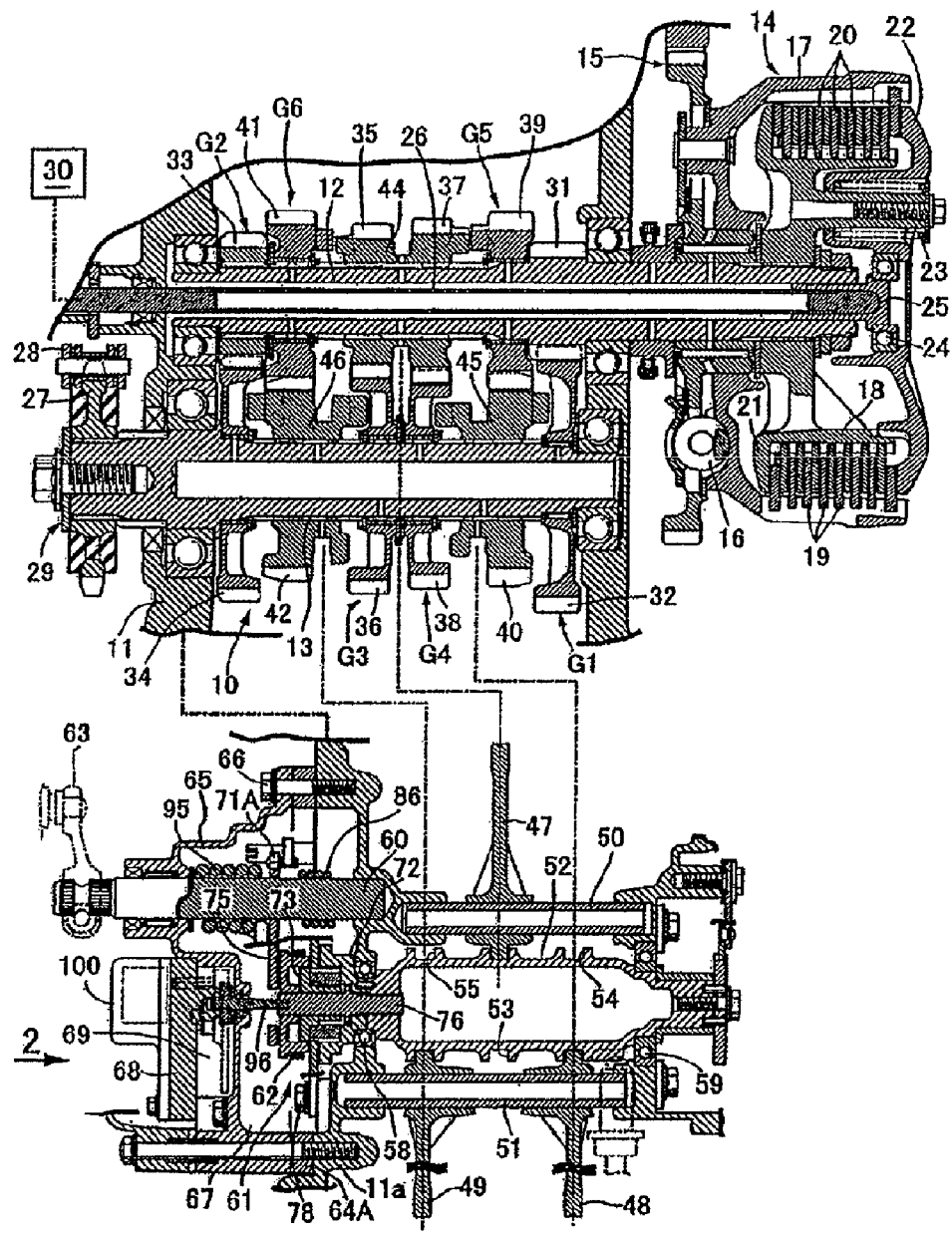
FIG. 1 is a longitudinal cross-sectional view showing an essential part of a transmission for a motorcycle according to a first embodiment.

FIG. 1 to FIG. 13 are views showing a first embodiment of the present invention. As illustrated in FIG. 1, the transmission is of a type which is used in a motorcycle and includes a gear shift mechanism 10 which is formed by arranging the gear trains of a plurality of selectively establishable shift positions, for example, six shift positions (first-speed to sixth-speed positions) G1, G2, G3, G4, G5, G6 between a main shaft 12 constituting a shift input shaft which is rotatably supported on an engine case 11 and a counter shaft 13 constituting a shift output shaft, wherein the main shaft 12 and the counter shaft 13 respectively have axes thereof arranged parallel to each other. The first-speed to sixth-speed gear trains G1 to G6 are housed in the engine case 11.

A clutch 14, which changes over connection/disconnection of transmission of power, is arranged between a crankshaft (not shown in the drawing) of an engine which constitutes a power source output shaft and one end portion of the main shaft 12. The clutch 14 includes a clutch outer 17 to which power is transmitted from the crankshaft by way of a primary speed reduction gear 15 and a torque damper 16, a clutch inner 18 which is arranged at a center portion in the clutch outer 17 and is joined to the main shaft 12 in a state wherein the relative rotation is prevented. A plurality of drive friction discs 19 is mounted on an inner peripheral wall of the clutch outer 17 by spline fitting in an axially slidable manner, a plurality of driven friction discs 20 which is alternately overlapped with the plurality of respective drive friction discs 19 and is mounted on an outer periphery of the clutch inner 18 in an axially slidable manner by spline fitting. A pressure receiving plate 21 is integrally formed on an inner end of the clutch inner 18 so as to receive the innermost drive friction disc 19 with a pressure applying plate 22 which is formed on an outer end of the clutch inner 18 in a slidable manner so as to push the outermost drive friction disc 19. A clutch spring 23 biases the pressure applying plate 22 toward the pressure receiving plate 21 side.

Further, in a state where the drive friction discs 19 and the driven friction discs 20 are clamped between the pressure applying plate 22 and the pressure receiving plate 21 due to a biasing force of the clutch spring 23, the clutch 14 is brought into a clutch ON state (power transmitting state) in which the clutch outer 17 and the clutch inner 18 are connected with each other by friction.

Further, at a center portion of the clutch inner 18, a release member 25 which interposes a release bearing 24 between the release member 25 and the pressure applying plate 22 is arranged, and a push rod 26 which is inserted into the main shaft 12 in an axially movable manner is connected to the release member 25. A clutch actuator 30 is provided which generates a pushing force and is joined to the push rod 26. By pushing the push rod 26 using the clutch actuator 30, the pressure applying plate 22 is retracted against the spring force of the clutch spring 23. Accordingly, the respective drive friction discs 19 and the respective driven friction discs 20 are brought into a free state so that the clutch 14 is brought into a clutch OFF state (power disconnected state) in which the clutch outer 17 and the clutch inner 18 are disconnected from each other.

On a side opposite to the clutch 14, a portion of the counter shaft 13 projects from the engine case 11, and a drive sprocket wheel 27 is fixed to a projecting end portion of the counter shaft 13 projected from the engine case 11. Further, a drive sprocket wheel 27 which constitutes a portion of a power-transmission means 29 together with an endless chain 28 is wound around the drive sprocket wheel 27, and power outputted from the counter shaft 13 is transmitted to a rear wheel not shown in the drawing by way of the power-transmission means 29.

The first-speed gear train G1 is constituted of a first-speed drive gear 31 which is integrally formed with the main shaft 12 and a first-speed driven gear 32 which is mounted on the counter shaft 13 in a state wherein the relative rotation is allowed and is meshed with the first-speed drive gear 31. The second-speed gear train G2 is constituted of a second-speed drive gear 33 which is mounted on the main shaft 12 in a state wherein the relative rotation is prevented and a second-speed driven gear 34 which is mounted on the counter shaft 13 in a state wherein the relative rotation is allowed and is meshed with the second-speed drive gear 33. The third-speed gear train G3 is constituted of a third-speed drive gear 35 which is mounted on the main shaft 12 in a state wherein the relative rotation is prevented and a third-speed driven gear 36 which is mounted on the counter shaft 13 in a state wherein the relative rotation is allowed and is meshed with the third-speed drive gear 35. The fourth-speed gear train G4 is constituted of a fourth-speed drive gear 37 which is mounted on the main shaft 12 in a state wherein the relative rotation is prevented and a fourth-speed driven gear 38 which is mounted on the counter shaft 13 in a state wherein the relative rotation is allowed and is meshed with the fourth-speed drive gear 37. The fifth-speed gear train G5 is constituted of a fifth-speed drive gear 39 which is mounted on the main shaft 12 in a state wherein the relative rotation is allowed and a fifth-speed driven gear 40 which is mounted on the counter shaft 13 in a state wherein the relative rotation is prevented and is meshed with the fifth-speed drive gear 39. The sixth-speed gear train G6 is constituted of a sixth-speed drive gear 41 which is mounted on the main shaft 12 in a state wherein the relative rotation is allowed and a sixth-speed driven gear 42 which is mounted on the counter shaft 13 in a state wherein the relative rotation is prevented and is meshed with the sixth-speed drive gear 41.

Between the fifth-speed drive gear 39 and the sixth-speed drive gear 41, a fifth-speed/sixth-speed changeover shifter 44 is mounted on the main shaft 12 in an axially slidable manner by spline fitting, the third-speed drive gear 35 is integrally formed on the fifth-speed/sixth-speed changeover shifter 44 in a state where the third-speed drive gear 35 faces the sixth-speed drive gear 41 in an opposed manner, and the fourth-speed drive gear 37 is integrally formed on the fifth-speed/sixth-speed changeover shifter 44 in a state where the fourth-speed drive gear 37 faces the fifth-speed drive gear 39 in an opposed manner. Between the first-speed driven gear 32 and the fourth-speed driven gear 38, a first-speed/fourth-speed changeover shifter 45 on which the fifth-speed driven gear 40 is integrally formed is mounted on the counter shaft 13 in an axially slidable manner by spline fitting. Between the second-speed driven gear 34 and the third-speed driven gear 36, a second-speed/third-speed changeover shifter 46 on which the sixth-speed driven gear 42 is integrally formed is mounted on the counter shaft 13 in an axially slidable manner by spline fitting.

When the fifth-speed/sixth-speed changeover shifter 44 is slid in the axial direction and is engaged with the fifth-speed drive gear 39, the fifth-speed drive gear 39 is joined to the main shaft 12 by way of the fifth-speed/sixth-speed changeover shifter 44 in a state wherein the relative rotation is prevented. Thus, the fifth-speed gear train G5 is established. Further, when the fifth-speed/sixth-speed changeover shifter 44 is slid in the axial direction and is engaged with the sixth-speed drive gear 41, the sixth-speed drive gear 41 is joined to the main shaft 12 by way of the fifth-speed/sixth-speed changeover shifter 44 in a state wherein the relative rotation is prevented so that the sixth-speed gear train G6 is established.

When the first-speed/fourth-speed changeover shifter 45 is slid in the axial direction and is engaged with the first-speed driven gear 32, the first-speed driven gear 32 is joined to the counter shaft 13 by way of the first-speed/fourth-speed changeover shifter 45 in a state wherein the relative rotation is prevented so that the first-speed gear train G1 is established. Further, when the first-speed/fourth-speed changeover shifter 45 is slid in the axial direction and is engaged with the fourth-speed driven gear 38, the fourth-speed driven gear 38 is joined to the counter shaft 13 by way of the first-speed/fourth-speed changeover shifter 45 in a state wherein the relative rotation is prevented so that the fourth-speed gear train G4 is established.

When the second-speed/third-speed changeover shifter 46 is slid in the axial direction and is engaged with the second-speed driven gear 34, the second-speed driven gear 34 is joined to the counter shaft 13 by way of the second-speed/third-speed changeover shifter 46 in a state wherein the relative rotation is prevented so that the second-speed gear train G2 is established. Further, when the second-speed/third-speed changeover shifter 46 is slid in the axial direction and is engaged with the third-speed driven gear 36, the third-speed driven gear 36 is joined to the counter shaft 13 by way of the second-speed/third-speed changeover shifter 46 in a state wherein the relative rotation is prevented so that the third gear train G3 is established.

The fifth-speed/sixth-speed changeover shifter 44 is rotatably held by a first shift fork 47, the first-speed/fourth-speed changeover shifter 45 is rotatably held by a second shift fork 48, and the second-speed/third-speed changeover shifter 46 is rotatably held by the third shift fork 49. The first shift fork 47 is supported on a first shift fork shaft 50 which is supported on the engine case 11 while having an axis thereof arranged parallel to an axis of the main shaft 12 and an axis of the counter shaft 13 in an axially slidable manner, and the second and third shift forks 48, 49 are supported on a second shift fork shaft 51 which is supported on the engine case 11 while having an axis thereof arranged parallel to the axis of the first shift fork 50 in an axially slidable manner.

A shift drum 52 having an axis thereof arranged parallel to the axis of the first and the axis of the second shift fork shafts 50, 51 is housed in the engine case 11, and is also rotatably supported on the engine case 11. Ball bearings 58, 59 are interposed between both ends of the shift drum 52 and the engine case 11. On an outer surface of the shift drum 52, three lead grooves 53, 54, 55 with which the first to third shift forks 47 to 49 are respectively engaged are formed. The lead grooves 53 to 55 are formed so as to decide positions of the first to third shift forks 47 to 49 on the first and second shift fork shafts 50, 51 corresponding to a rotational position of the shift drum 52. By rotating the shift drum 52, the first to sixth-speed gear trains G1 to G6 are selectively established to correspond to a rotational position of the shift drum 52.

A shift spindle 60 constitutes a shift drive shaft is rotatably mounted on the engine case 11 so as to be rotated in response to a shift manipulation. A shift drive force transmitting mechanism 61 can rotatably drive the shift drum 52 corresponding to the rotation of the shift spindle 60 and is arranged between the shift spindle 60 and the shift drum 52. A lost motion spring 62 which constitutes a lost motion means for temporarily accumulating a shift drive force transmitted from the shift spindle 60 is arranged in the shift drive force transmitting mechanism 61.

The shift spindle 60 is rotatably mounted on the engine case 11 while having an axis thereof arranged parallel to the axis of the shift drum 52, and a shift lever 63 which is interlockingly joined to a change pedal (not shown in the drawing) is fixed to one end portion of the shift spindle 60.

Figure 2:
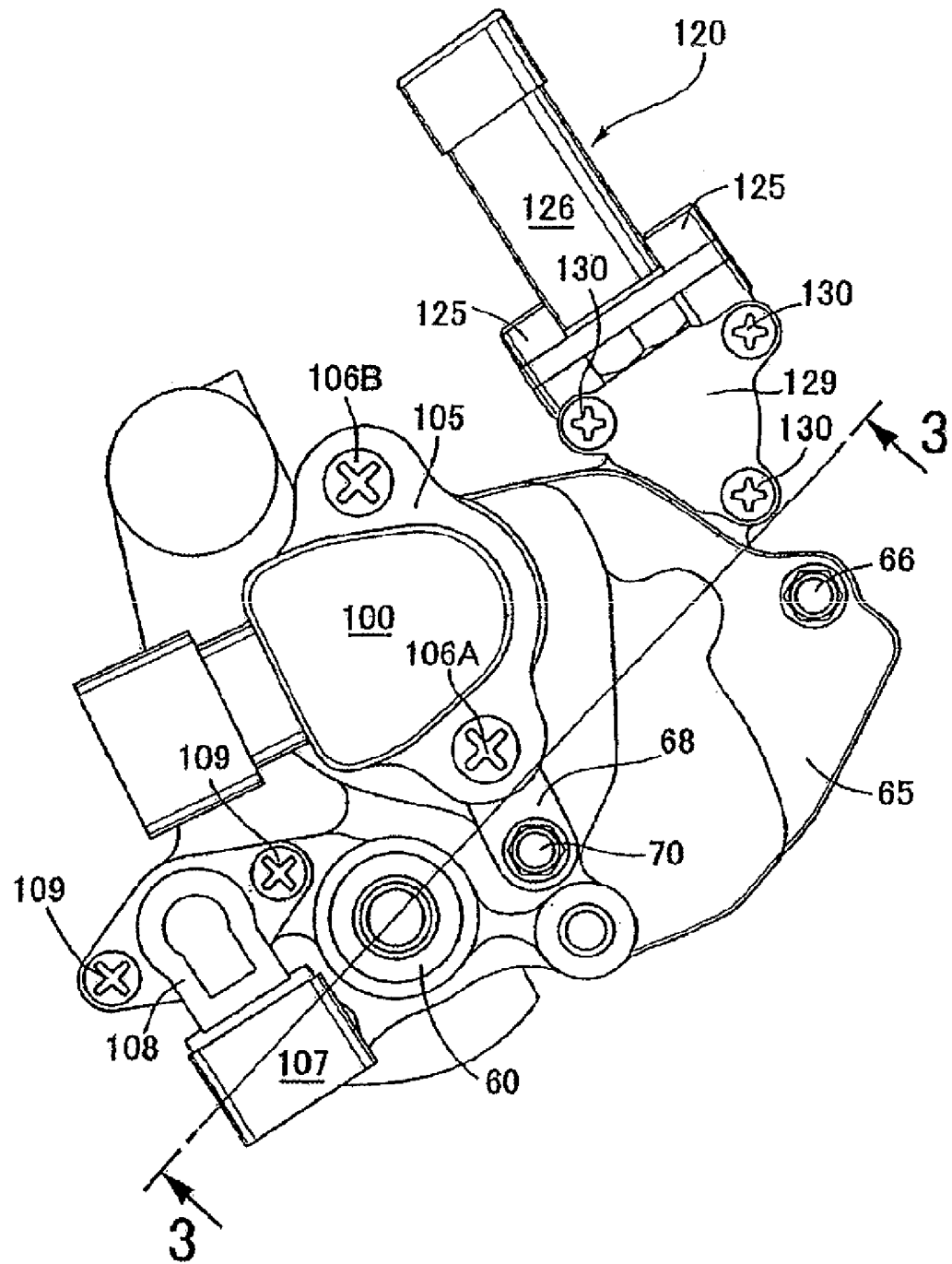
FIG. 2 is an enlarged view as viewed in the direction indicated by an arrow 2 in FIG. 1.
Figure 3:
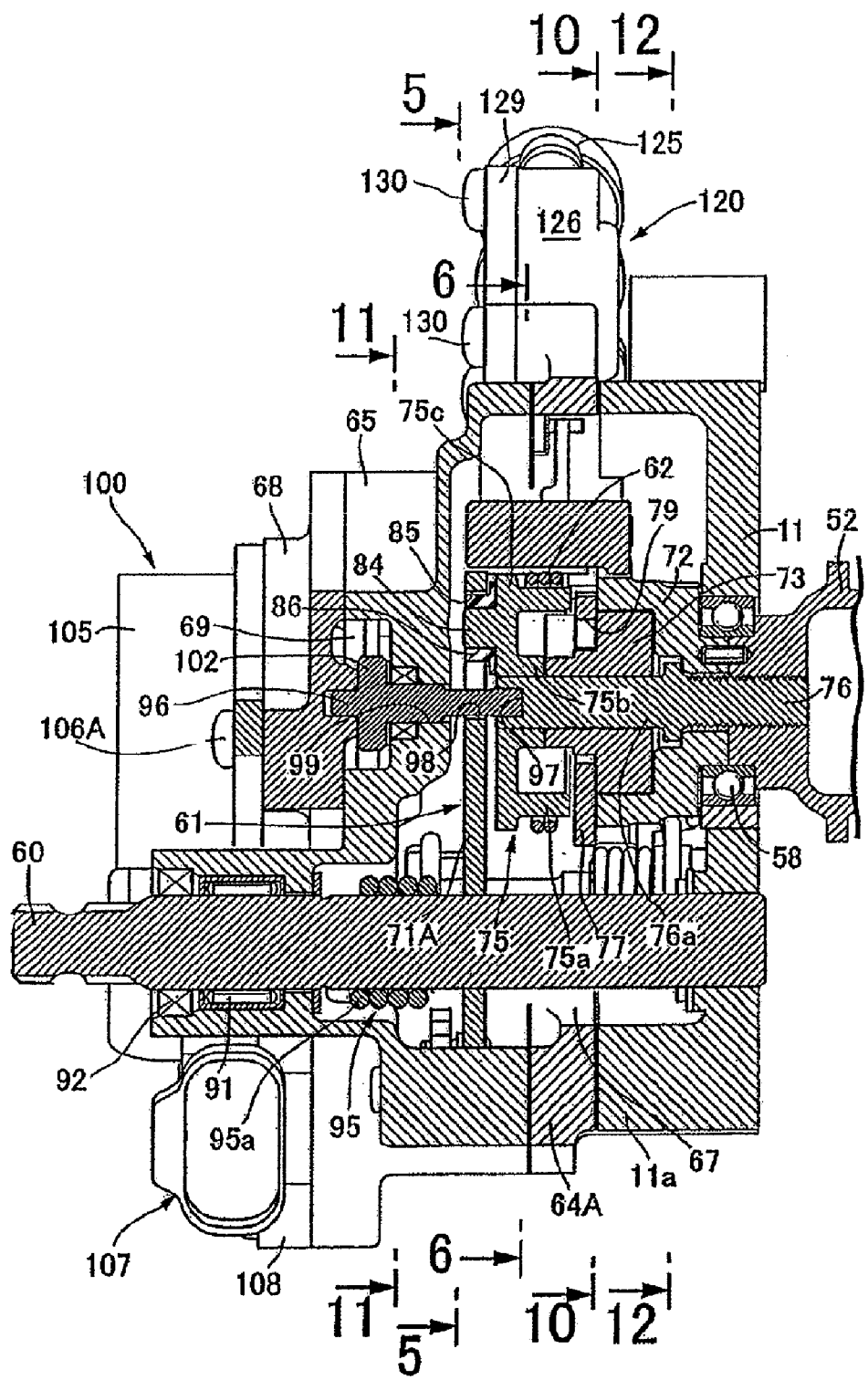
FIG. 3 is a cross-sectional view taken along a line 3-3 in FIG. 2.
Figure 4:
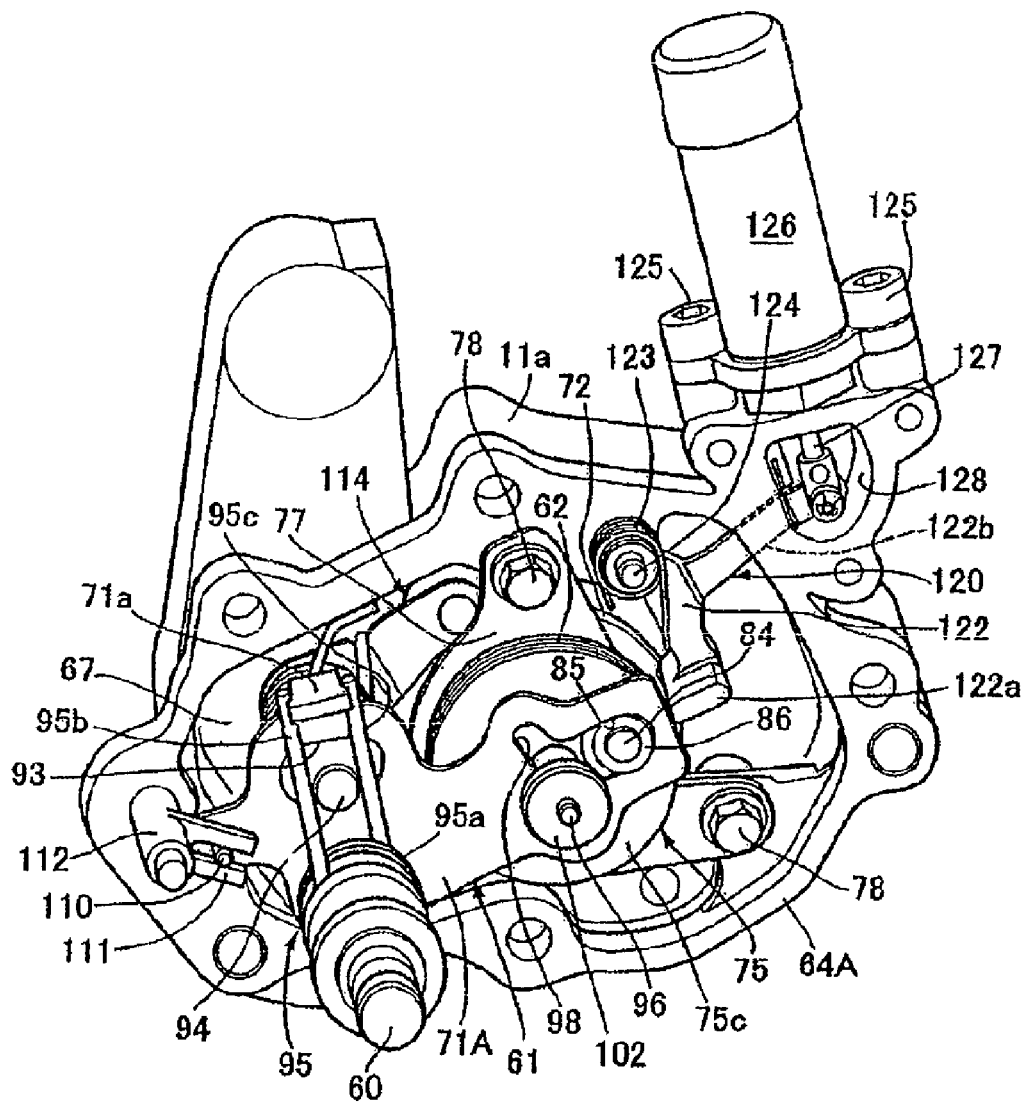
FIG. 4 is a perspective view showing a state where a shift cover and a gear cover are removed from the construction shown in FIG. 2.

To explain the construction of this embodiment also in conjunction with FIG. 2 and FIG. 3, on one end side of the shift drum 52, a wall portion 11a annularly surrounds the shift spindle 60 and a portion of the shift drive force transmitting mechanism 61 is integrally formed on the engine case 11. A shift cover 65 is fastened to the wall portion 11a using a plurality of bolts 66 together with a wall member 64A which is formed annularly and contiguously with the wall portion 11a in such a manner that the wall member 64A is interposed between the shift cover 65 and the wall portion 11a. An operation chamber 67 which houses a portion of the shift spindle 60 and the shift drive force transmitting mechanism 61 is defined by the engine case 11, the wall member 64A and the shift cover 65. The shift spindle 60 has one end thereof projecting from the shift cover 65 and the projecting end is rotatably supported on the engine case 11 and the shift cover 65. A needle bearing 91 and a dust seal 92 which is arranged outside the needle bearing 91 are interposed between the shift cover 65 and the shift spindle 60. Further, a gear cover 68 which covers a portion of the shift cover 65 is fastened to the shift cover 65 using bolts 70, 106B in such a manner that a gear chamber 69 is formed between the gear cover 68 and the shift cover 65.

To explain the construction of this embodiment also in conjunction with FIG. 4 to FIG. 7, the shift drive force transmitting mechanism 61 includes a master arm 71A which has a proximal end portion thereof fixed to the shift spindle 60, a shift drum center 72 which is coaxially fixed to one end portion of the shift drum 52 outside the engine case 11, a drum shifter 73 constituting a second force-transmission rotary member which has a portion thereof arranged inside the shift drum center 72 and is coaxially rotatable about an axis of the shift drum center 72. A pawl ratchet mechanism 74 is arranged between the shift drum center 72 and the drum shifter 73 with a force-transmission rotary member 75 which is coaxially arranged to face the shift drum center 72 from the outside in an opposed manner such that a rotational force is transmitted to the force-transmission rotary member 75 from the master arm 71A and also houses at least a portion of the drum shifter 73. The lost motion spring 62 is arranged between the force-transmission rotary member 75 and the drum shifter 73.

The shift drum center 72 is formed in a bottomed stepped cylindrical shape and closes a shift-drum-52-side thereof.

The shift drum center 72 is fixed to one end of the shift drum 52 using a shift drum bolt 76 which is coaxial with the shift drum 52.

Figure 8:
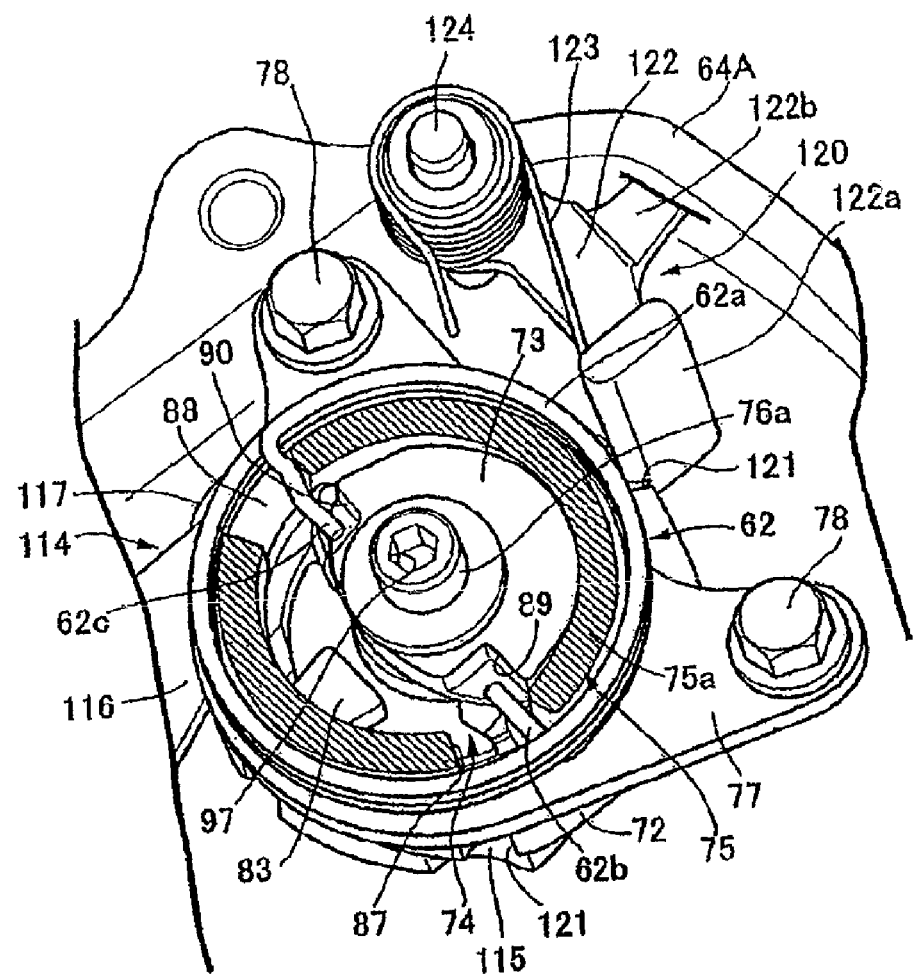
FIG. 8 is a perspective view showing a portion of a shift drive force transmitting mechanism in a state where a power transmitting rotary member is notched.
Figure 9:
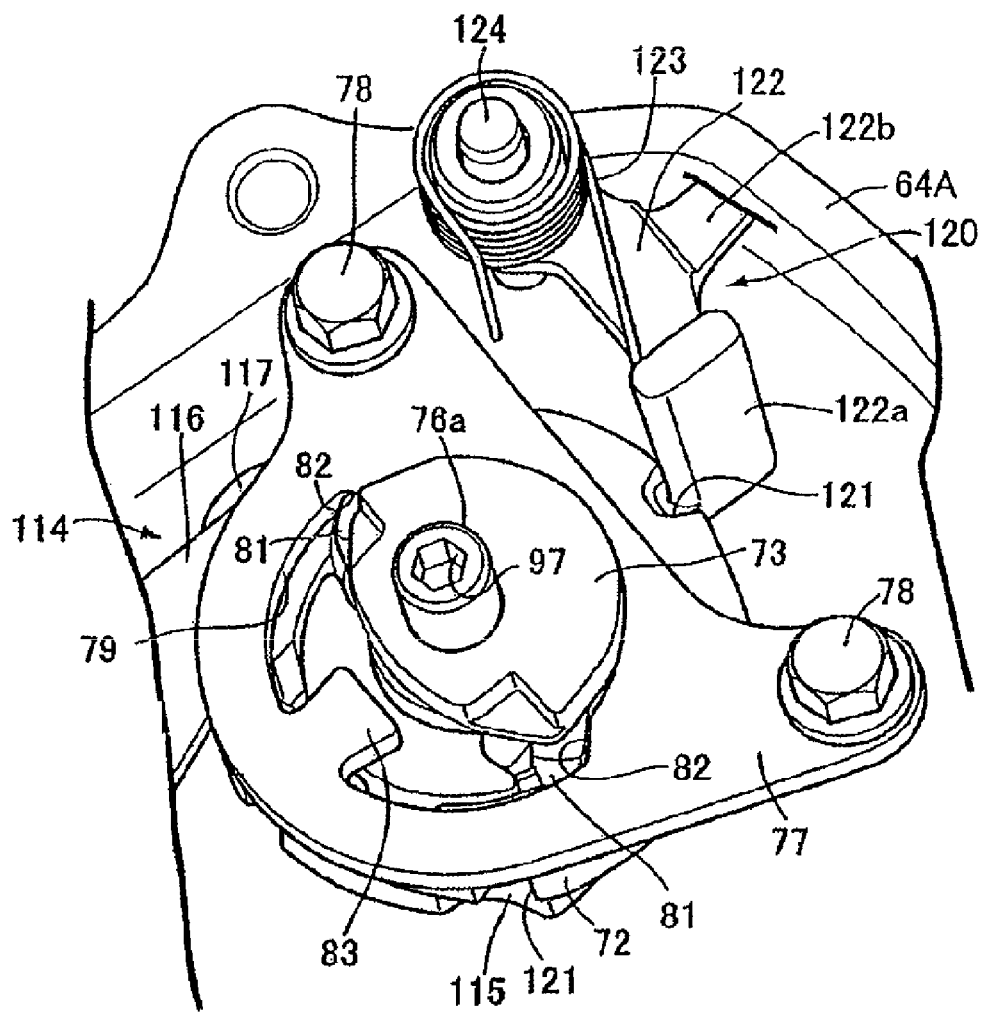
FIG. 9 is a perspective view corresponding to FIG. 8 in a state where the power transmitting rotary member and a lost motion spring are removed.

To explain the construction of this embodiment also in conjunction with FIG. 8 and FIG. 9, a guide plate 77 is fixed to the wall member 64A using, for example, a pair of bolts 78, 78 in such a manner that the shift drum center 72 is sandwiched between the guide plate 77 and the engine case 11. An approximately circular opening portion 79 corresponding to the drum shifter 73 is formed in the guide plate 77. The drum shifter 73 is rotatably supported on a shaft portion 76a which is coaxially formed with the shift drum bolt 76, and the drum shifter 73 is rotatable relative to and coaxially with an axis of the shift drum center 72. A portion of an outer periphery of the drum shifter 73 is covered with a peripheral portion of the opening portion 79 so that the removal of the drum shifter 73 from the shift drum center 72 can be prevented.

Figure 10:
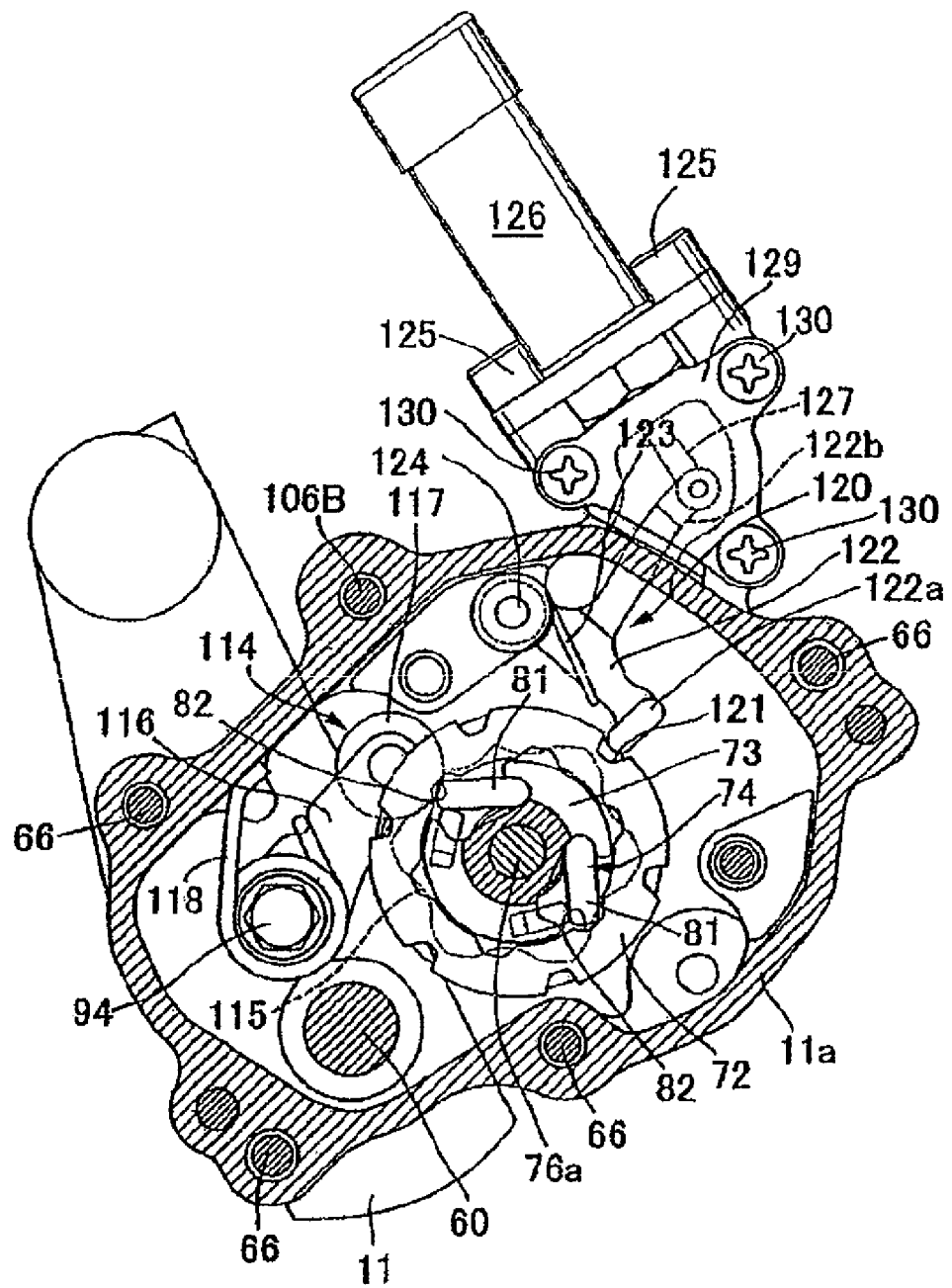
FIG. 10 is a cross-sectional view taken along a line 10-10 in FIG. 3.

In FIG. 10, the pawl ratchet mechanism 74 which is arranged between the shift drum center 72 and the drum shifter 73 is constituted of a pair of pawls 81 which is symmetrically mounted on the drum shifter 73 such that the pawls 81 can be raised and lowered in the radial direction of the shift drum center 72 and is biased toward a raising side by springs. A plurality of engaging recessed portions 82 is formed on an inner periphery of the shift drum center 72 such that the plurality of engaging recessed portions 82 can be engaged with one pawl 81 which is determined corresponding to the rotational direction of the drum shifter 73 out of these pawls 81. Due to the rotation of the drum shifter 73 relative to the shift drum center 72, either one of both pawls 81 is selectively engaged with one of the plurality of engaging recessed potions 82 thus rotatably driving the shift drum center 72 and the shift drum 52.

Further, a restricting projection 83 which projects inwardly from the opening portion 79 is integrally formed on the guide plate 77 in a projecting manner. Since one of both pawls 81 of the pawl ratchet mechanism 74 is brought into contact with the restricting projection 83, it is possible to prevent the drum shifter 73 and the shift drum 52 from being rotated with a rotational quantity beyond which is necessary in one rotational operation.

The force-transmission rotary member 75 is arranged to be sandwiched between the master arm 71A and the guide plate 77. The force-transmission rotary member 75 is formed in a bottomed duplicate cylindrical shape which is opened toward the shift drum center 72 side. The force-transmission rotary member 75 is formed of an integral body constituted of an outer cylindrical portion 75a which has an outer diameter substantially equal to an outer diameter of the shift drum center 72 and houses a portion of the drum shifter 73, an inner cylindrical portion 75b which allows a shaft portion 76a of the shift drum bolt 76 to pass therethrough and brings an inner end portion thereof into slide contact with the drum shifter 73, and a disc-shaped end wall portion 75c which joins an outer end portion of the outer cylindrical portion 75a and an outer end portion of the inner cylindrical portion 75b. The force-transmission rotary member 75 is rotatably supported on the shaft portion 76a.

A pin 84 which projects toward a side opposite to the guide plate 77 is formed on the end wall portion 75c of the force-transmission rotary member 75 in a projecting manner at a position offset from a rotational axis of the force-transmission rotary member 75, that is, an axis of the shaft portion 76a. On the other hand, an elongated guide hole 85 which extends in the radial direction of the shift spindle 60 is formed in the master arm 71A, and a roller 86 which is brought into rolling contact with both edges of the guide hole 85 is rotatably mounted on the pin 84. Due to the rotation of the master arm 71A which is caused along with the rotation of the shift spindle 60, a rotational force about an axis of the shaft portion 76a is transmitted to the pin 84, that is, the force-transmission rotary member 75 from the master arm 71A.

Figure 6:
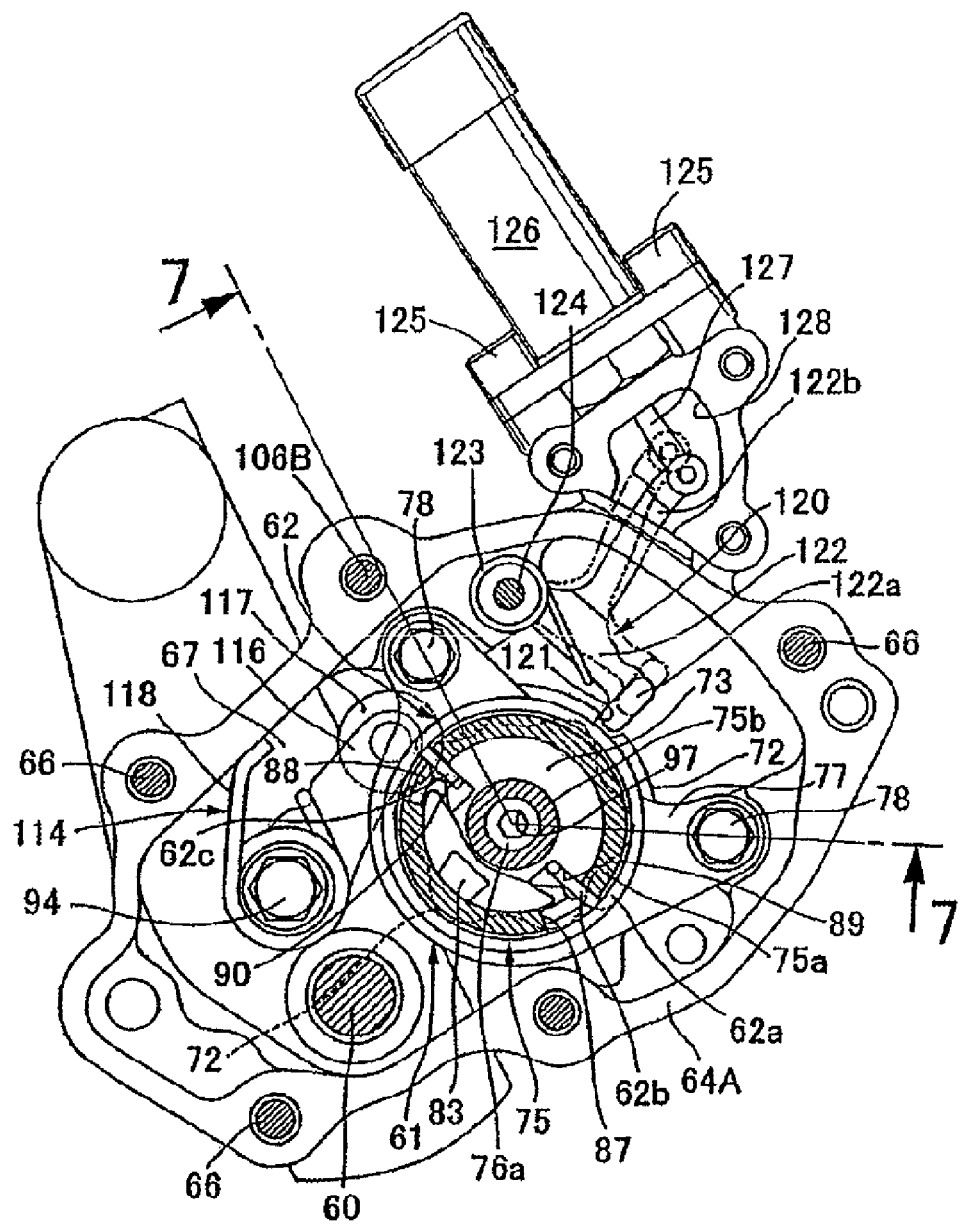
FIG. 6 is a cross-sectional view taken along a line 6-6 in FIG. 3.

To focus on the construction shown in FIG. 6 and FIG. 8, the lost motion spring 62 which is arranged between the force-transmission rotary member 75 and the drum shifter 73 is constituted such that engaging portions 62b, 62c which extend toward the inside of the lost motion spring 62 are formed on both ends of the coil portion 62a which surrounds the outer cylindrical portion 75a of the force-transmission rotary member 75. Further, in the outer cylindrical portion 75a, a pair of through holes 87, 88 which allows both engaging portions 62b, 62c to pass therethrough is formed in a state wherein the through holes 87, 88 extend in the circumferential direction. On the drum shifter 73 a stopper portion 89 which is engageable with the engaging portion 62b out of both engaging portions 62b, 62c from one circumferential direction of the drum shifter 73 and a stopper portion 90 which is engageable with another engaging portion 62c out of both engaging portions 62b, 62c from another circumferential direction of the drum shifter 73 are formed.

Due to the provision of such a lost motion spring 62, irrespective of the rotating direction of the force-transmission rotary member 75, a rotational force is transmitted to the drum shifter 73 by way of the lost motion spring 62. Thus, when the rotation of the shift drum 52 and the rotation of the shift drum center 72 are in a constrained state, the rotation of the drum shifter 73 is also in a constrained state. Thus, the force-transmission rotary member 75 is rotated while leaving the drum shifter 73 in a constrained state whereby the lost motion spring 62 temporarily accumulates a shift drive force transmitted from the shift spindle 60.

Figure 11:
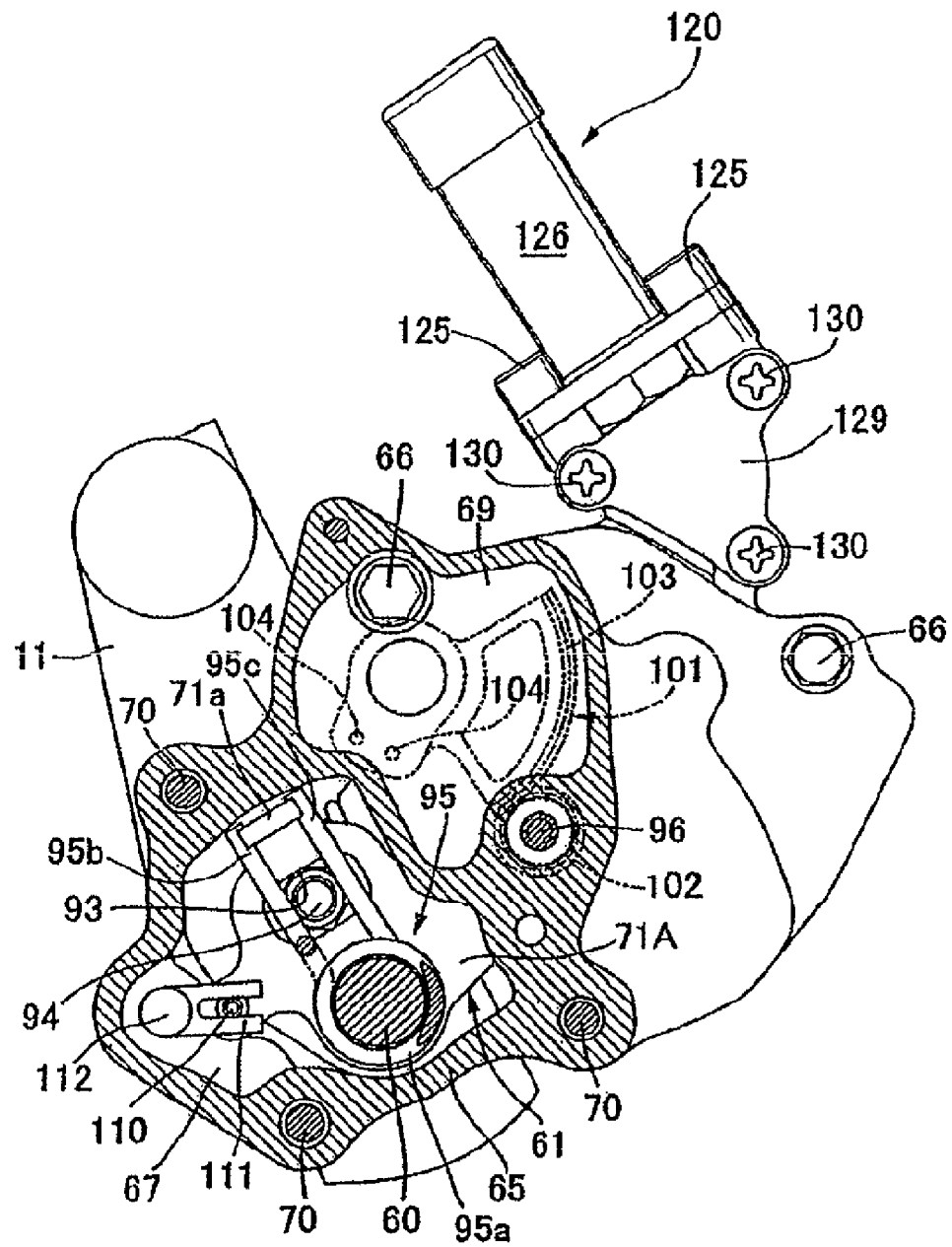
FIG. 11 is a cross-sectional view taken along a line 11-11 in FIG. 3.

To explain the construction of this embodiment also in conjunction with FIG. 11, a restricting hole 93 is formed in the master arm 71A in the vicinity of the shift spindle 60 and along an arc about an axis of the shift spindle 60. A stopper pin 94 which is mounted on the engine case 11 is inserted into the restriction hole 93. Accordingly, since the stopper pin 94 is brought into contact with both ends of the restricting hole 93 formed along the circumferential direction of the shift spindle 60, a rotational range of the master arm 71A about the axis of the shift spindle 60 is restricted.

Further, the master arm 71A is biased so as to return to an original neutral position due to a return spring 95. The return spring 95 is formed such that sandwiching portions 95b, 95c which sandwich the stopper pin 94 from both sides are integrally and contiguously connected to both ends of a coil portion 95a which surrounds the shift spindle 60. An engaging portion 71a which is arranged between both sandwiching portions 95b, 95c outside the stopper pin 94 is integrally mounted on the master arm 71A.

When the master arm 71A is rotated about the axis of the shift spindle 60, the engaging portion 71a of the master arm 71A is brought into contact and is engaged with one of both sandwiching portions 95b, 95c and another of both sandwiching portions 95b, 95c is brought into contact with the stopper pin 94 so that another of both sandwiching portions 95b, 95c is left there. Accordingly, the engaging portion 71a is rotated while deflecting one sandwiching portion such that one sandwiching portion is separated from the stopper pin 94. When a load which is applied to the master arm 71A is released, due to a spring force of the deflected sandwiching portion out of both sandwiching portions 95b, 95c, the master arm 71A returns the engaging portion 71a to a neutral position located outside the stopper pin 94.

A rod-shaped member 96 to be detected is coaxially joined to the shaft portion 76a of the shift drum bolt 76 in a state wherein the rotation of the rod-shaped member 96 relative to the shaft portion 76a is prevented. More specifically, a non-circular fitting recessed portion 97 is coaxially formed on an outer end of the shaft portion 76a, and one end portion of the member 96 to be detected is fitted in the fitting recessed portion 97 in a state that the rotation of the rod-shaped member 96 relative to the shaft portion 76a is prevented.

The member 96 to be detected passes through a through hole 98 which is formed in the master arm 71A and also rotatably passes through a through hole 99 which is formed in the shift cover 65. The member 96 to be detected is rotatably supported on the shift cover 65 and the gear cover 68. The through hole 98 formed in the master arm 71A is formed in an elongated shape in the circumferential direction of the shift spindle 60 so as to prevent the member 96 to be detected from interfering with the master arm 71A when the master arm 71A is rotated. The guide hole 85 and the through hole 98 are communicated with each other so as to form a substantially T shape.

On an outer surface of the gear cover 68, a sensor case 105 of a shift position sensor 100 is fastened to the gear cover 68 using a pair of bolts 106A, 106B in a state where a portion of the sensor case 105 faces the gear chamber 69. The shift position sensor 100 obtains a shift rotational position of the shift drum 52 by detecting a rotational quantity of the member 96 to be detected. More specifically, by detecting a rotational quantity of the shift drum center 72 and the shift drum 52. One bolt 106B is inserted into the sensor case 105 and the gear cover 68 and is threadedly engaged with the shift cover 65.

A speed reduction mechanism 101 which transmits the a rotational operation quantity of the member 96 to be detected to the shift position sensor 100 side at a reduced speed is interposed between the member 96 to be detected and the shift position sensor 100. The speed reduction mechanism 101 is housed in the gear chamber 69.

Figure 7:
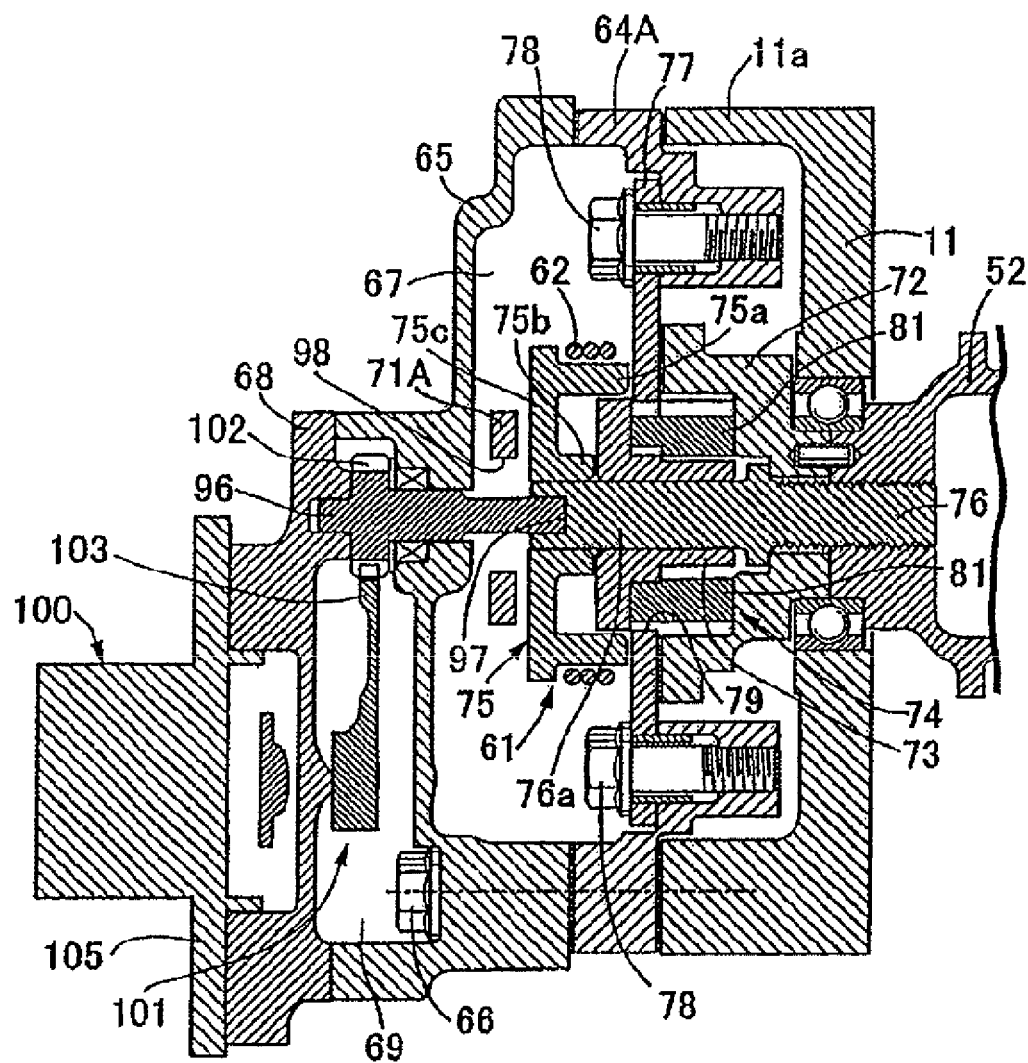
FIG. 7 is a cross-sectional view taken along a line 7-7 in FIG. 6.

To focus on the construction shown in FIG. 7 and FIG. 11, the speed reduction mechanism 101 includes a drive gear 102 which is fixedly mounted on the member 96 to be detected, and a sector gear 103 which is meshed with the drive gear 102. As shown in FIG. 11, a pair of engaging pins 104, 104 is mounted on the sector gear 103 in an offset manner from the rotational axis of the sector gear 103, and the shift position sensor 100 includes a detecting part (not shown in the drawing) which is sandwiched between both engaging pins 104, 104.

A spindle angle sensor 107 which detects a rotational quantity of the shift spindle 60 is mounted on the shift cover 65, and a case 108 of the spindle angle sensor 107 is fastened to the shift cover 65 using a plurality of screw members 109.

Further, a pin 110 is mounted on the master arm 71A at a position offset from the shift spindle 60. A proximal end portion of a lever 111 which has a distal end portion thereof engaged with the pin 110 is fixed to a detecting shaft 112 which the spindle angle sensor 107 includes. When the shift spindle 60 and the master arm 71A are rotated, the detecting shaft 112 is rotated corresponding to the rotational quantity of the shift spindle 60 and the master arm 71A. Thus, the rotational quantity of the shift spindle 60 and the master arm 71A is detected by the spindle angle sensor 107.

Figure 12:
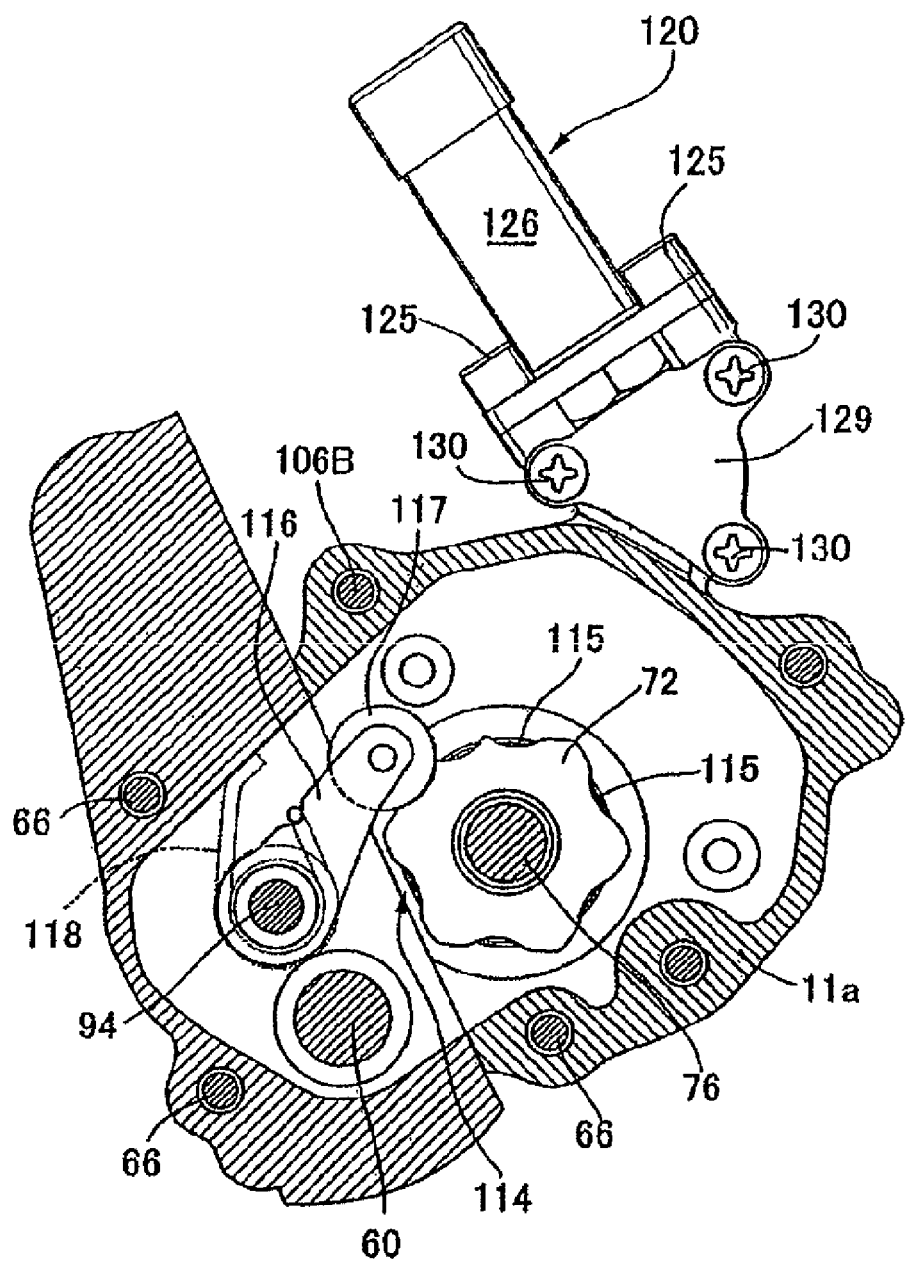
FIG. 12 is a cross-sectional view taken along a line 12-12 in FIG. 3.

In FIG. 12, in a state where one of the first-speed to sixth-speed gear trains G1, G2, G3, G4, G5 and G6 of the gear shift mechanism 10 is established and in a neutral state where none of gear trains G1 to G6 is established, a rotational position of the shift drum 52 and the shift drum center 72 is resiliently held by a shift stopper mechanism 114.

The shift stopper mechanism 114 includes a plurality of arcuately-recessed positioning notches 115 which is formed in an outer periphery of the shift drum center 72 at positions corresponding to a plurality of predetermined rotational positions set by the shift drum 52, a stopper arm 116 which has a proximal end portion thereof rotatably supported on the stopper pin 94 and has a distal end portion on which a roller 117 which is engageable with one of the positioning notches 115 is pivotally supported. A torsional spring 118 is arranged between the engine case 11 and the stopper arm 116 so as to generate a spring force for biasing the stopper arm 116 such that the roller 117 is brought into sliding contact with the outer periphery of the shift drum center 72.

The state which allows the changeover operation of the established state of the first to sixth gear trains G1 to G6 due to an action of a shift driver force which is temporarily accumulated by the lost motion spring 62 and the state which interrupts the changeover operation can be changed over by a shift restricting mechanism 120 which is provided as a part separate from the shift stopper mechanism 114. In this embodiment, the rotation of the shift drum 52 and the shift drum center 72 is also interrupted by the shift restricting mechanism 120.

The shift restricting mechanism 120 is arranged closer to a shift drum 52 side than the lost motion spring 62 on a shift drive force transmitting path formed by the shift drive force transmitting mechanism 61 and is configured to change over an engagement thereof with the shift drum center 72 which is a rotary member constituting a portion of the shift drive force transmitting mechanism 61 and a disengagement thereof from the shift drum center 72. The shift restricting mechanism 120 is arranged outside the engine case 11.

The shift restricting mechanism 120 includes a plurality of engaging recessed portions 121 which is formed on an outer periphery of the shift drum center 72 at a position axially displaced from the positioning notches 115, an engaging arm 122 constituting an engaging member which includes an engaging portion 122a engageable with one of these engaging recessed portions 121 and is rotatably supported on a support shaft 124, a torsional spring 123 which is a resilient member for resiliently biasing the engaging arm 122 in the direction opposite to a side where the engaging portion 122a is engaged with one of the engaging recessed portions 121, and a rotation restricting actuator 126 which exhibits a driving force for engaging the engaging portion 122a with one of the engaging recessed portions 121 against a spring force of the torsional spring 123. The support shaft 124 has an axis which is parallel to an axis of the shift drum center 72, and is supported on the shift cover 65 and a wall member 64A. The torsional spring 123 which surrounds the support shaft 124 is provided between the shift cover 65 and the engaging arm 122.

A connecting arm portion 122b which extends toward a side away from the shift drum center 72 is integrally and contiguously formed on an intermediate portion of the engaging arm 122, and the rotation restricting actuator 126 is connected to the connecting arm portion 122b.

The rotation restricting actuator 126 is a solenoid which has a rod 127 having an axis thereof arranged in a plane orthogonal to an axis of the shift drum center 72 and an axis of the support shaft 124 and, at the same time, pushes the rod 127 in the axial direction when electricity is supplied to the solenoid. The rotation restricting actuator 126 is fastened to the wall member 64A by bolts 125, 125.

A housing chamber 128 is formed in the wall member 64A adjacent to the operation chamber 67, and the rod 127 is connected to the connecting arm portion 122b in the inside of the housing chamber 128. Further, a lid member 129 which closes the housing chamber 128 is fastened to the wall member 64A by a plurality of, for example, three screw members 130.

In a state where electricity is supplied to the rotation restricting actuator 126, the engaging portion 122a of the engaging arm 122 is engaged with one of the engaging recessed portions 121 of the shift drum center 72 due to a pushing force of the rotation restricting actuator 126, and the rotation of the shift drum center 72 and the shift drum 52 is interrupted in such a state. On the other hand, in a state where electricity is not supplied to the rotation restricting actuator 126, the engaging arm 122 is rotated so as to remove the engaging portion 122a from the engaging recessed portion 121 due to a spring force of the torsional spring 123, and the rotation of the shift drum center 72 and the shift drum 52 is allowed in such a state.

Figure 13:
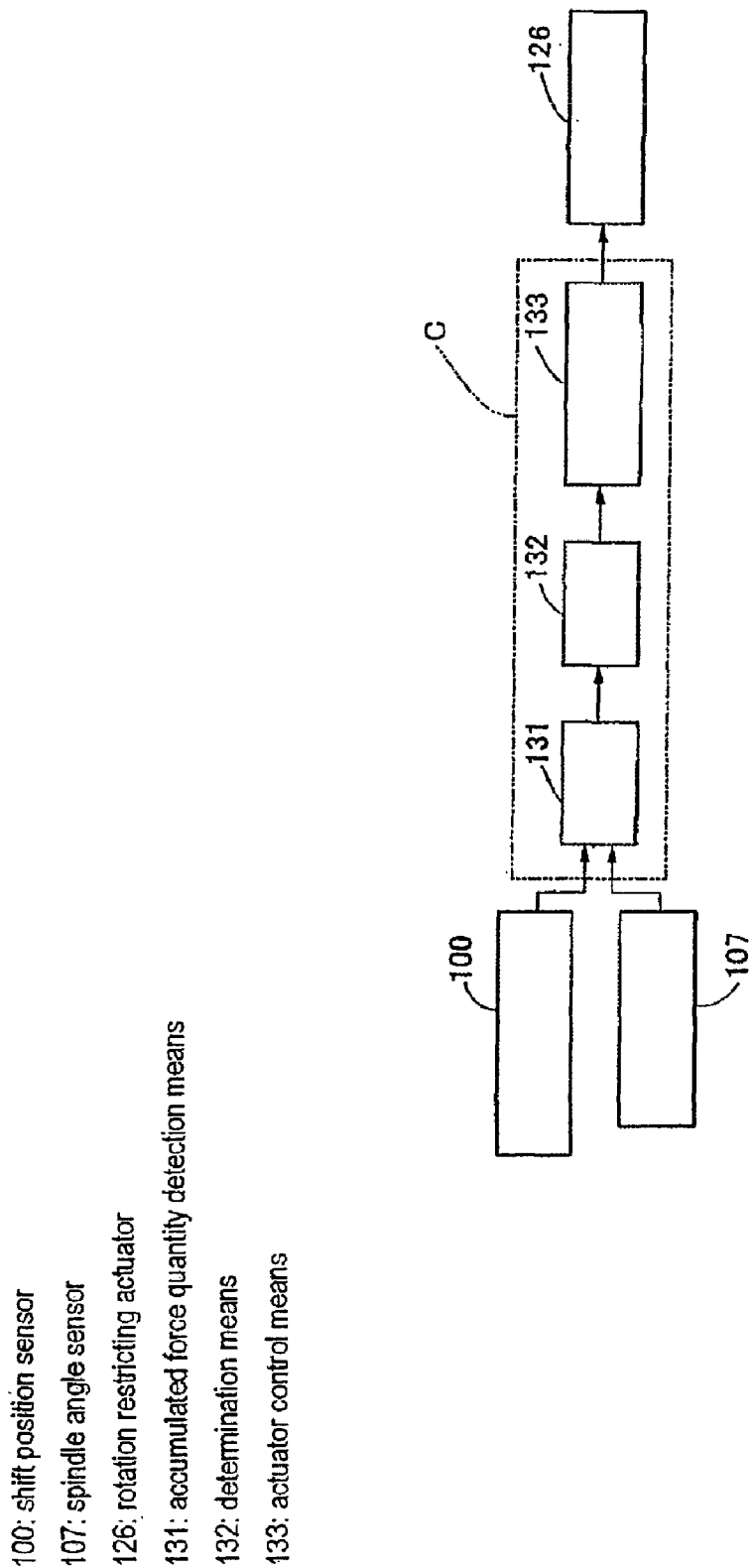
FIG. 13 is a block diagram showing a control system for controlling the manner of operation of a shift restricting mechanism.

In FIG. 13, an operation of the rotation restricting actuator 126 is controlled by a control unit C. The control unit C includes an accumulated force quantity detection means 131 which detects a temporarily accumulated quantity of a shift drive force accumulated by the lost motion spring, a determination means 132 which determines whether or not a detected value of the accumulated force quantity detection means 131 exceeds a predetermined value, and an actuator control means 133 which controls an operation of the rotation restricting actuator 126 in response to a determination result of the determination means 132. The actuator control means 133 brings the rotation restricting actuator 126 into an electricity non-supply state such that the engaging arm 122 is rotated toward a side which allows the rotation of the shift drum 52 in response to the determination by the determination means 132 that the detected value exceeds the predetermined value.

To the accumulated force quantity detection means 131, a detected value of the shift position sensor 100 which detects a rotational quantity of the shift drum center 72 and the shift drum 52, and a detected value of the spindle angle sensor 107 which detects a rotational quantity of the shift spindle 60 are inputted. More specifically, when the shift spindle 60 is rotatably manipulated in a state where the rotation of the shift drum center 72 is restricted, the lost motion spring 62 accumulates a shift manipulation force so as to generate the relative rotation of the force-transmission rotary member 75 with respect to the drum shifter 73. By subtracting the detected value of the shift position sensor 100 from the detected value of the spindle angle sensor 107, an accumulated force quantity by the lost motion spring 62 corresponding to the relative rotational quantity of the force-transmission rotary member 75 relative to the drum shifter 73 is detected by the accumulated force quantity detection means 131.

Next, the manner of operation of this first embodiment is explained. In a state where one of the first to sixth gear trains G1 to G6 provided to the gear shift mechanism 10 is established and a neutral state in which none of these gear trains G1 to G6 is established, the rotary position of the shift drum 52 is resiliently held by the shift stopper mechanism 114. Separately from such a shift stopper mechanism 114, a state in which the rotation of the shift drum 52 is interrupted and a state in which the rotation of the shift drum 52 is allowed can be changed over by the shift restricting mechanism 120. The shift restricting mechanism 120 is arranged closer to the shift drum 52 side than the lost motion spring 62 on the shift drive force transmitting path formed by the shift drive force transmitting mechanism 61 and is configured to change over an engagement thereof with the shift drum center 72 which constitutes a portion of the shift drive force transmitting mechanism 61 and a disengagement thereof from the shift drum center 72.

Accordingly, the rotation of the shift drum 52 can be interrupted by the shift restricting mechanism 120 until the lost motion spring 62 accumulates power sufficient for rotating the shift drum 52 and can release a rotation interrupting state of the shift drum 52 by the shift restricting mechanism 120 when necessary. Thus, the shift manipulation can be performed at a predetermined time irrespective of irregularities of a lost quantity by a lost motion spring 62 while acquiring favorable shift manipulation feeling due to a function of the lost motion spring 62.

Further, the shift drum center 72 is coaxially fixed to the shift drum 52 outside the engine case 11 which houses the shift drum 52 therein, and the shift restricting mechanism 120 which changes over the engagement thereof with the shift drum center 72 and the disengagement thereof from the shift drum center 72 is arranged outside the engine case 11. Thus, the maintenance of the shift restricting mechanism 120 can be easily performed.

Further, the operation of the rotation restricting actuator 126 which the shift restricting mechanism 120 includes is controlled by the actuator control means 133. Thus, the interruption of rotation of the shift drum 52 and the release of such interruption of rotation by the shift restricting mechanism 120 can be changed over at a proper time.

Further, the clutch 14 which is operated so as to change over the connection/disconnection of power transmission using the clutch actuator 30 is provided between the crank shaft of the engine which constitutes a power-source output shaft and the main shaft 12 of the gear shift mechanism 10. The temporarily accumulated quantity of the shift drive force by the lost motion spring 62 is detected by the accumulated force quantity detection means 131. The determination means 132 determines whether or not the detected value of the accumulated force quantity detection means 131 exceeds a predetermined value. In response to the determination by the determination means 132 that the detected value of the accumulated force quantity detection means 131 exceeds the predetermined value, the actuator control means 133 controls the rotation restricting actuator 126 so as to allow the operation of the shift restricting mechanism 120 on a side which allows the rotation of the shift drum 52. Accordingly, the interruption of rotation of the shift drum and the release of such interruption of rotation by the shift restricting mechanism 120 can be changed over at a proper time. Thus, the shift manipulation can be performed at a predetermined time which conforms to the starting of the power transmission interrupting operation of the clutch 14.

Further, the shift drive force transmitting mechanism 61 includes the force-transmission rotary member 75 which is provided on a transmission path formed by the shift drive force transmitting mechanism 61 and is provided on the shift drive shaft 60 side. The drum shifter 73 is provided closer to the shift drum 52 side than the force-transmission rotary member 75 on the transmission path. The lost motion spring 62 is arranged between the force-transmission rotary member 75 and the drum shifter 73. The operation chamber 67 which houses the shift drive force transmitting mechanism 61 therein is defined by the engine case 11, the shift cover 65 and the wall member 64A which is sandwiched between the engine case 11 and the shift cover 65. Accordingly, in conformity with large-sizing of the shift drive force transmitting mechanism 61 in the axial direction of the shift drum 52 by an amount that the lost motion mechanism including the lost motion spring 62 is arranged, the wall member 64A is sandwiched between the engine case 11 and the shift cover 65. Due to such a construction, it is possible to ensure a space for arranging the shift drive force transmitting mechanism 61, while it is possible to cope with a transmission which does not include a lost motion mechanism by removing the wall member 64A. In this manner, even when the lost motion mechanism is provided which includes the lost motion spring 62, it is possible to make cases such as the exclusive use of the engine case 11 and the shift cover 65 and the like unnecessary.

Further, the guide plate 77 sandwiches the shift drum center 72 coaxially fixed to one end portion of the shift drum 52 with the engine case 11 outside the engine case 11 and interrupts the removal of the drum shifter 73 which is partially arranged in the inside of the shift drum center 72 from the shift drum center 72. The guide plate 77 is mounted on the wall member 64A in a state where the guide plate 77 has the restricting projection 83 which restricts the excessive rotation of the shift drum 52. Accordingly, it is unnecessary to apply a forming operation for mounting the guide plate 77 on the engine case 11 side.

Further, the force-transmission rotary member 75 is sandwiched between the guide plate 77 and a master arm 71A which is fixed to the shift spindle 60. Thus, it is possible to make the wall member 64A thin by suppressing a width of the shift drive force transmitting mechanism 61 in the axial direction of the shift drum 52 as much as possible thus contributing to the reduction of the weight of the transmission of a vehicle.

Further, the force-transmission rotary member 75 which constitutes a portion of the shift drive force transmitting mechanism 61 is arranged coaxially with the shift drum 52 so as to be rotated in an interlocking manner with the rotation of the shift spindle 60. At least a portion of the drum shifter 73 which constitutes a portion of the shift drive force transmitting mechanism 61 is arranged coaxially with the shift drum 60 and is housed in the inside of the force-transmission rotary member 75. On both ends of the lost motion spring 62 which is formed into a coil shape surrounding the force-transmission rotary member 75 and to which a rotational force is transmitted from the force-transmission rotary member 75, engaging portions 62b, 62c which extend toward the inside of the lost motion spring 62 are respectively formed. The drum shifter 73 is provided with an engaging portion 89 which is engageable with one engaging portion 62b out of both engaging portions 62b, 62c from one circumferential direction of the drum shifter 73 and an engaging portion 90 which is engageable with another engaging portion 62c out of both engaging portions 62b, 62c from another circumferential direction of the drum shifter 73.

Accordingly, it is unnecessary to ensure a space for engaging both ends of the lost motion spring 62 with the power transmission rotary member which constitutes a portion of the shift drive force transmitting mechanism outside the coil-shaped lost motion spring 62 in the radial direction. Accordingly, a space for arranging the lost motion mechanism including the lost motion spring 62 can be made small and, at the same time, a thickness of the wall member 64A can be further decreased thus realizing a further miniaturization of the transmission.

Further, the force-transmission rotary member 75 includes an outer cylindrical portion 75a which covers at least a portion of a drum shifter 73 and is arranged coaxially with the shift drum 52, and a pair of insertion holes 87, 88 which allows the insertion of the above-mentioned both engaging portions 62b, 62c of the lost motion spring 62 therethrough are formed in the outer cylindrical portion 75a in a state where the insertion holes 87, 88 extend in the circumferential direction. Accordingly, the mechanism which transmits a rotational force to the lost motion spring 62 from the force-transmission rotary member 75 can have a simple and compact construction.

Further, the plurality of engaging recessed portions 121 is formed on the outer periphery of the shift drum center 72. The shift restricting mechanism 120 includes the engaging arm 122 which is engageable with one of the engaging recessed portions 121, the torsional spring 123 which biases the engaging arm 122 toward a side in which the engagement of the engaging arm 122 with the engaging recessed portion 121 is released, and the rotation restricting actuator 126 which exhibits a drive force for engaging the engaging portion 122a with one of the engaging recessed portions 121 against a spring force of the torsional spring 123. Accordingly, in a state where electricity is not supplied to the rotation restricting actuator 126, the rotation of the shift drum 52 is not restricted so that the shift drum 52 is freely rotatable.

Figure 5:
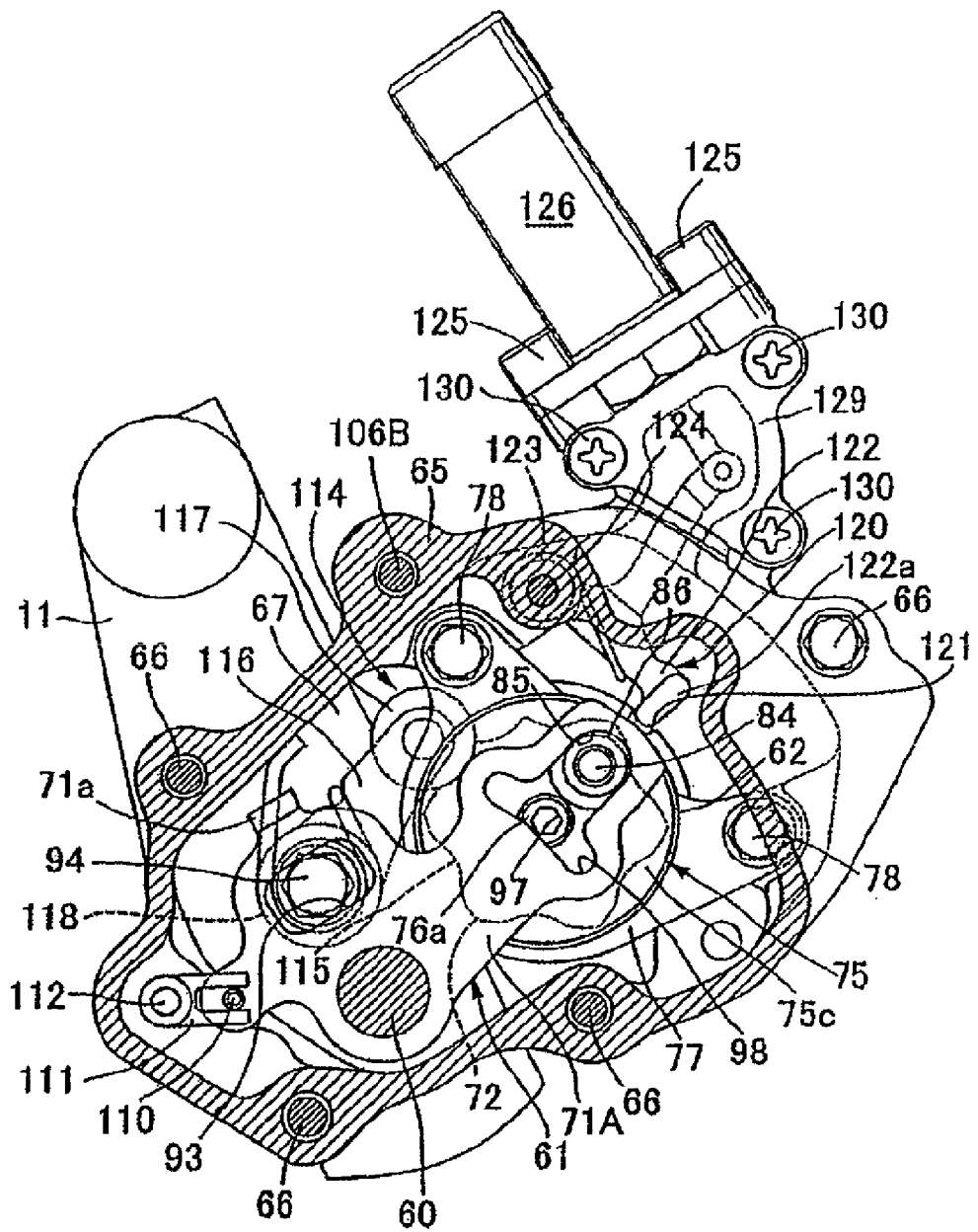
FIG. 5 is a cross-sectional view taken along a line 5-5 in FIG. 3.
Figure 14:
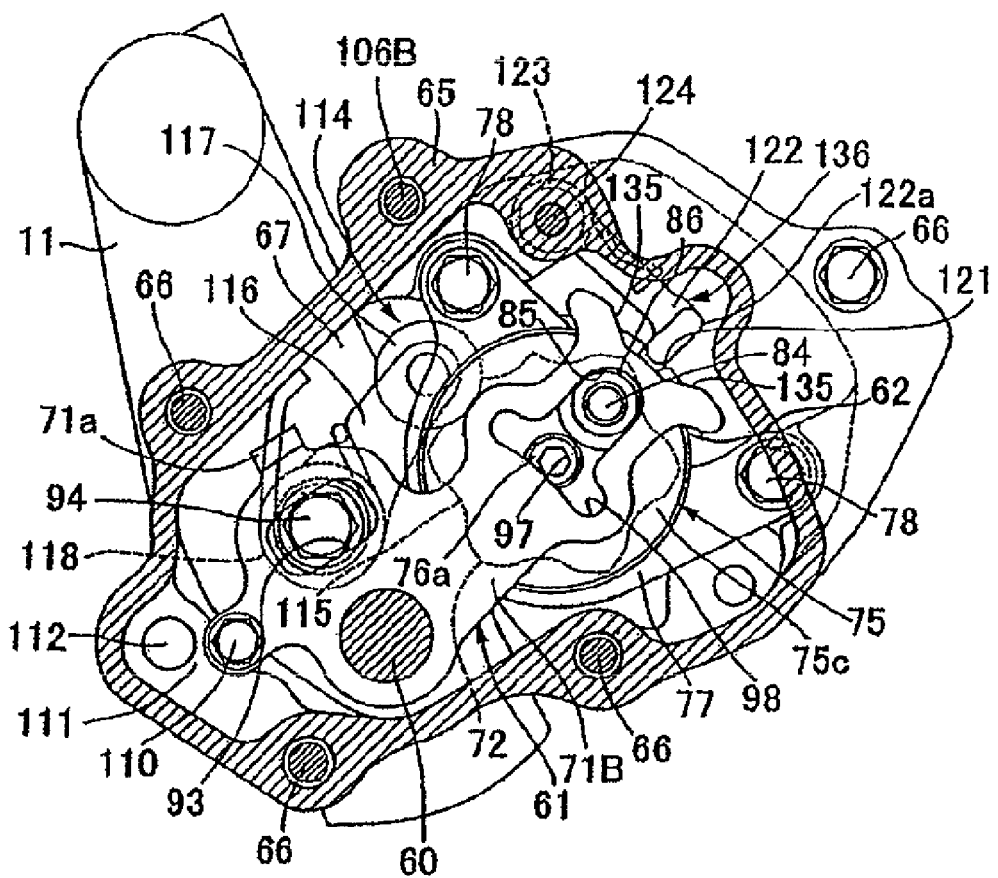
FIG. 14 is a cross-sectional view showing a second embodiment and corresponding to FIG. 5 which shows the first embodiment.

FIG. 14 shows a second embodiment of the present invention, and is a cross-sectional view corresponding to FIG. 5 which shows the first embodiment.

In this second embodiment, parts corresponding to the parts of the first embodiment are only shown in the drawings while giving the same reference symbols to these parts, and their detailed explanation is omitted.

A shift restricting mechanism 136 includes a plurality of engaging recessed portions 121 which is formed on an outer periphery of a shift drum center 72, an engaging arm 122 constituting an engaging member which has an engaging portion 122a engageable with one of these engaging recessed portions 121 and is rotatably supported on a support shaft 124, a torsional spring 123 constituting a resilient member which resiliently biases the engaging arm 122 toward a side where the engaging portion 122a engages with one of the engaging recessed portions 121, and a master arm 71B.

On a distal end portion of the master arm 71B which has a proximal end portion thereof fixed to the shift spindle 60, a pair of contact inclined surfaces 135, 135 which is positioned on both sides of the engaging portion 122a of the engaging arm 122 is formed in a state where the contact inclined surfaces 135, 135 faces the engaging portion 122a side. Both contact inclined surfaces 135 are formed with an inclination such that both inclined surfaces 135 are separated from the engaging portion 122a along with the separation of both contact inclined surfaces 135 from the shift spindle 60.

By forming the master arm 71B in such a shape, the engaging arm 122 is rotatably driven such that when the shift spindle 60 and the master arm 71B are rotated by a predetermined rotational quantity, one of these both contact inclined surfaces 135 is brought into contact with the engaging portion 122a which is engaged with the engaging recessed portion 121, and when the shift spindle 60 and the master arm 71B are further rotated, the engaging portion 122a is removed from the engaging recessed portion 121.

More specifically, due to the rotation of the shift spindle 60 and the master arm 71B by a predetermined rotational quantity or more, the engaging arm 122 which has the engaging portion 122a thereof engaged with one of the engaging recessed portions 121 so as to interrupt the rotation of the shift drum 52 (see first embodiment) is automatically operated by the master arm 71B so as to allow the rotation of the shift drum 52. Accordingly, the rotation restricting actuator 126 which is necessary in the first embodiment is unnecessary in the second embodiment.

Further, the engaging arm 122 of the shift restricting mechanism 136 is resiliently biased toward the side where the engaging arm 122 engages with the engaging recessed portion 121 due to the torsional spring 123. Thus, in a state where the master arm 71 assumes a neutral position, the rotation of the shift drum 52 can be mechanically interrupted without using an actuator such as a solenoid or an electrically-operated motor.

Figure 15:
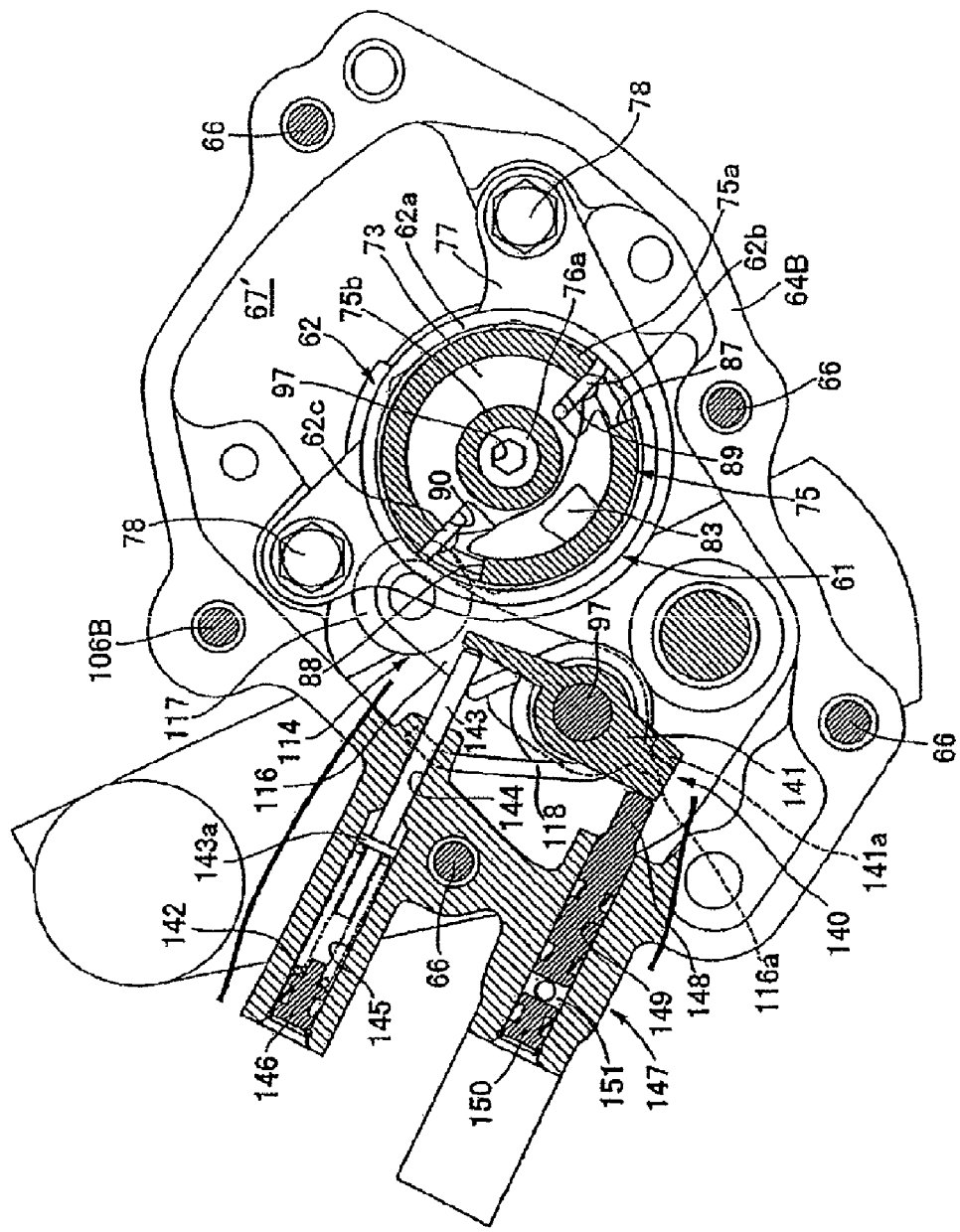
FIG. 15 is a cross-sectional view showing a third embodiment and corresponding to FIG. 6 which shows the first embodiment.

FIG. 15 shows a third embodiment of the present invention, and is a cross-sectional view corresponding to FIG. 6 which shows the first embodiment.

Also in this third embodiment, parts corresponding to the parts of the first embodiment are only shown in the drawings while giving the same reference symbols to these parts, and their detailed explanation is omitted.

While a stopper arm 116 of a shift stopper mechanism 114 is rotatably supported on a stopper pin 94, a state in which the rotation of a shift drum 52 is interrupted and a state in which the rotation of the shift drum 52 is allowed are changed over by a shift restricting mechanism 140 separately from the shift stopper mechanism 114.

The shift restricting mechanism 140 includes, as constitutional elements used in common with the shift stopper mechanism 114, the stopper arm 116 and a torsional spring 118 which is arranged between an engine case 11 and the stopper arm 116 so as to generate a spring force which biases the stopper arm 116 such that a roller 117 pivotally supported on the stopper arm 116 is brought into a slide contact with an outer periphery of a shift drum center 72. In addition to these elements, the shift restricting mechanism 140 includes a sub shift stopper arm 141 which is rotatably supported on a stopper pin 94 which rotatably supports the stopper arm 116 thereon such that the sub shift stopper arm 141 partially overlaps with the stopper arm 116 in the axial direction of the stopper pin 94, a coil spring 142 which biases the sub shift stopper arm 141 toward a side where the stopper arm 116 is rotated toward a side where the stopper arm 116 is engaged with the shift drum center 72, and a rotation restricting actuator 147.

More specifically, in this shift restricting mechanism 140, positioning notches 115 which are engaged with a roller 117 of the stopper arm 116 function as engaging recessed portions with which an engaging member is engaged, the stopper arm 116 functions as the engaging member, and the coil spring 142 functions as a resilient member.

A projection 116a which projects toward a side opposite to the roller 117 is integrally formed on a proximal end portion of the stopper arm 116. A pushing projection 141a which is brought into contact with the projection 116a in the clockwise direction in FIG. 15 is integrally formed on the sub shift stopper arm 141. One end of a pushing rod 143 which is biased by the coil sprig 142 is brought into contact with one end of the sub shift stopper arm 141 in a state where one end of the pushing rod 143 rotatably biases the sub shift stopper arm 141 in the clockwise direction in FIG. 15. More specifically, in a state where the sub shift stopper arm 141 pushes the stopper arm 116 in the clockwise direction in FIG. 15, the roller 117 is biased toward a side where the roller 117 is engaged with the shift drum center 72 not only by a spring force of a torsional spring 118 but also by a spring force of the coil spring 142. Thus, the rotation of the shift drum 52 is interrupted in such a state.

In a wall member 64B which forms a portion of an operation chamber 67' which houses a shift drive force transmitting mechanism 61, a slide hole 144 which allows a slidable fitting of the pushing rod 143 therein, and an accommodating hole 145 which movably accommodates a flange portion 143a formed on another end side of the pushing rod 143 and is coaxially contiguous with the slide hole 144 are formed. The coil spring 142 is provided in a shrunken state between a lid member 146 which is fitted in and fixed to the accommodating hole 145 so as to hermetically close an outer end of the accommodating hole 145 and the flange portion 143a.

Further, the rotation restricting actuator 147 is mounted on the wall member 64B. The rotation restricting actuator 147 includes a plunger 148 which has one end thereof brought into contact with another end of the sub shift stopper arm 141 such that the sub shift stopper arm 141 is rotatably driven in the direction opposite to the biasing direction of the pushing rod 143, that is, in the counterclockwise direction in FIG. 15.

A cylinder hole 149 which allows the slidable fitting of the plunger 148 therein is formed in the wall member 64B. An oil pressure chamber 151 is formed between a lid member 150 which is fitted in and fixed to an outer end of the cylinder hole 149 so as to hermetically close an outer end of the cylinder hole 149 and the plunger 148. By applying an oil pressure to the oil pressure chamber 151, the plunger 148 is operated so as to rotatably drive the sub shift stopper arm 141 in the counterclockwise direction in FIG. 15.

With the use of such a rotation restricting actuator 147, to interrupt the rotation of the shift drum 52, the oil pressure is not applied to the oil pressure chamber 151 so that the sub shift stopper arm 141 pushes the stopper arm 116 toward a side where the roller 117 is fitted in the positioning notch 115 due to a spring force generated by the coil spring 142. On the other hand, to allow the rotation of the shift drum 52, the oil pressure is applied to the oil pressure chamber 151 so that the sub shift stopper arm 141 is rotated toward a side where the pushing projection 141a is separated from the projection 116a. Accordingly, the stopper arm 116 can be rotated so as to remove the roller 117 from the positioning notch 115 thus allowing the rotation of the shift drum 52.

This third embodiment also can acquire the substantially equal advantageous effects as the above-mentioned second embodiment.

In the above-mentioned respective embodiments, an explanation has been made with respect to a case wherein the shift restricting mechanism is used for restricting the rotation of the shift drum. However, the operation of the shift fork which is engaged with the shift drum or the operation of a shifter which changes over the establishment of a gear train may be restricted by the shift restricting mechanism.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission for a vehicle comprising:
 a gear shift mechanism formed by arranging gear trains of a plurality of selectively establishable shift positions (G1, G2, G3, G4, G5, G6) between a shift input shaft and a shift output shaft;
 a shift drum rotatably supported on an engine case for selectively establishing one of the plurality of gear trains (G1 to G6) in response to a rotational position;
 a shift spindle rotatably mounted on the engine case so as to be rotatable in response to a shift manipulation;
 a shift drive force transmitting mechanism arranged between the shift spindle and the shift drum for rotatably driving the shift drum in response to the rotation of the shift spindle;
 a lost motion means disposed in the shift drive force transmitting mechanism for temporarily accumulating a shift drive force transmitted from the shift spindle; and a shift stopper mechanism for resiliently holding a rotary position of the shift drum in a state where one of the plurality of gear trains (G1 to G6) is established or in a neutral state;

wherein the transmission further includes, separately from the shift stopper mechanism, a shift restricting mechanism for performing a changeover between a state for allowing a changeover operation of an established state of the plurality of gear trains (G1 to G6) due to an action of the shift drive force which is temporarily accumulated by the lost motion means and a state which interrupts the changeover operation.

2. The transmission for a vehicle according to claim 1, wherein the shift restricting mechanism is arranged closer to a shift drum side than the lost motion means on a shift drive force transmitting path formed by the shift drive force transmitting mechanism and is configured to change over an engagement thereof with a rotary member which constitutes a portion of the shift drive force transmitting mechanism and a disengagement thereof from the rotary member.

3. The transmission for a vehicle according to claim 2, wherein a shift drum center which constitutes the rotary member is coaxially fixed to the shift drum outside the engine case which houses the shift drum, and the shift restricting mechanism for changing over the engagement thereof with the shift drum center and the disengagement thereof from the shift drum center is arranged outside the engine case.

4. The transmission for a vehicle according to claim 2, wherein the shift restricting mechanism includes a rotation restricting actuator for generating power for performing the changeover between the engagement of the shift restricting mechanism with the rotary member and the disengagement of the shift restricting mechanism from the rotary member wherein operation is controlled by an actuator control means.

5. The transmission for a vehicle according to claim 3, wherein the shift restricting mechanism includes a rotation restricting actuator for generating power for performing the changeover between the engagement of the shift restricting mechanism with the rotary member and the disengagement of the shift restricting mechanism from the rotary member wherein operation is controlled by an actuator control means.

6. The transmission for a vehicle according to claim 4, wherein the transmission further comprises:
a clutch for changing over a connection/disconnection of the transmission of power between a power source output shaft and the shift input shaft;
a clutch actuator for performing an engagement/disengagement of the clutch;
an accumulated force quantity detection means for detecting a temporarily accumulated quantity of shift drive force accumulated by the lost motion means; and
a determination means for determining whether or not a detected value of the accumulated force quantity detection means exceeds a predetermined value and outputs a determination result to the actuator control means;
the actuator control means controls the rotation restricting actuator for operating the shift restricting mechanism to a side for allowing the rotation of the shift drum in response to the determination of the determination means that the detected value of the accumulated force quantity detection means exceeds the predetermined value.

7. The transmission for a vehicle according to claim 5, wherein the transmission further comprises:
a clutch for changing over a connection/disconnection of the transmission of power between a power source output shaft and the shift input shaft;
a clutch actuator for performing an engagement/disengagement of the clutch;
an accumulated force quantity detection means for detecting a temporarily accumulated quantity of shift drive force accumulated by the lost motion means; and
a determination means for determining whether or not a detected value of the accumulated force quantity detection means exceeds a predetermined value and outputs a determination result to the actuator control means;
the actuator control means controls the rotation restricting actuator for operating the shift restricting mechanism to a side for allowing the rotation of the shift drum in response to the determination of the determination means that the detected value of the accumulated force quantity detection means exceeds the predetermined value.

8. The transmission for a vehicle according to claim 2, wherein an engaging recessed portion is formed on an outer periphery of the shift drum center, and the shift restricting mechanism includes an engaging member engageable with the engaging recessed portion and a resilient member for resiliently biasing the engaging member toward a side where the engaging member is engaged with the engaging recessed portion.

9. The transmission for a vehicle according to claim 3, wherein an engaging recessed portion is formed on an outer periphery of the shift drum center, and the shift restricting mechanism includes an engaging member engageable with the engaging recessed portion and a resilient member for resiliently biasing the engaging member toward a side where the engaging member is engaged with the engaging recessed portion.

10. The transmission for a vehicle according to claim 4, wherein an engaging recessed portion is formed on an outer periphery of the shift drum center, and the shift restricting mechanism includes an engaging member engageable with the engaging recessed portion and a resilient member for resiliently biasing the engaging member toward a side where the engaging member is engaged with the engaging recessed portion.

11. The transmission for a vehicle according to claim 6, wherein an engaging recessed portion is formed on an outer periphery of the shift drum center, and the shift restricting mechanism includes an engaging member engageable with the engaging recessed portion and a resilient member for resiliently biasing the engaging member toward a side where the engaging member is engaged with the engaging recessed portions portion.

12. A transmission for a vehicle comprising:
a shift drum rotatably supported on an engine case for selectively establishing one of the plurality of gear trains (G1 to G6) in response to a rotational position;
a shift spindle rotatably mounted on the engine case so as to be rotatable in response to a shift manipulation;
a shift drive force transmitting mechanism arranged between the shift spindle and the shift drum for rotatably driving the shift drum in response to the rotation of the shift spindle;
a lost motion means disposed in the shift drive force transmitting mechanism for temporarily accumulating a shift drive force transmitted from the shift spindle; and
a shift stopper mechanism for resiliently holding a rotary position of the shift drum in a state where one of the plurality of gear trains (G1 to G6) is established or in a neutral state;
wherein the transmission further includes, separately from the shift stopper mechanism, a shift restricting mechanism including an engaging recessed portion formed on an outer periphery of a shift drum center at a position axially displaced from positioning notches, an engaging arm constituting an engaging member including an engaging portion engagable with the engaging recessed portion and rotatably supported on a support shaft and a torsional spring for resiliently biasing the engaging arm in the direction opposite to a side where the engaging portion is engaged with the engaging recessed portion for performing a changeover between a state for allowing a changeover operation of an established state of the plurality of gear trains (G1 to G6) due to an action of the shift drive force which is temporarily accumulated by the lost motion means and a state which interrupts the changeover operation.

13. The transmission for a vehicle according to claim 12, wherein the shift restricting mechanism is arranged closer to a shift drum side than the lost motion means on a shift drive force transmitting path formed by the shift drive force transmitting mechanism and is configured to change over an engagement thereof with a rotary member which constitutes a portion of the shift drive force transmitting mechanism and a disengagement thereof from the rotary member.

14. The transmission for a vehicle according to claim 13, wherein the shift drum center which constitutes the rotary member is coaxially fixed to the shift drum outside the engine case which houses the shift drum, and the shift restricting mechanism for changing over the engagement thereof with the shift drum center and the disengagement thereof from the shift drum center is arranged outside the engine case.

15. The transmission for a vehicle according to claim 13, wherein the shift restricting mechanism includes a rotation restricting actuator for generating power for performing the changeover between the engagement of the shift restricting mechanism with the rotary member and the disengagement of the shift restricting mechanism from the rotary member wherein operation is controlled by an actuator control means.

16. The transmission for a vehicle according to claim 15, wherein the transmission further comprises:
 a clutch for changing over a connection/disconnection of the transmission of power between a power source output shaft and the shift input shaft;
 a clutch actuator for performing an engagement/disengagement of the clutch;
 an accumulated force quantity detection means for detecting a temporarily accumulated quantity of shift drive force accumulated by the lost motion means; and
 a determination means for determining whether or not a detected value of the accumulated force quantity detection means exceeds a predetermined value and outputs a determination result to the actuator control means;
 the actuator control means controls the rotation restricting actuator for operating the shift restricting mechanism to a side for allowing the rotation of the shift drum in response to the determination of the determination means that the detected value of the accumulated force quantity detection means exceeds the predetermined value.

17. The transmission for a vehicle according to claim 13, wherein the engaging member is engageable with the engaging recessed portion and a resilient member resiliently biases the engaging member toward a side where the engaging member is engaged with the engaging recessed portion.

18. The transmission for a vehicle according to claim 14, wherein the engaging member is engageable with the engaging recessed portion and a resilient member resiliently biases the engaging member toward a side where the engaging member is engaged with the engaging recessed portion.

* * * * *